US012804768B2

(12) United States Patent
Peng

(10) Patent No.: US 12,804,768 B2
(45) Date of Patent: Nov. 17, 2026

(54) COMMUNICATION METHOD, COMMUNICATION APPARATUS, COMPUTER STORAGE MEDIUM, AND COMMUNICATION SYSTEM

(71) Applicant: HUAWEI TECHNOLOGIES CO., LTD., Shenzhen (CN)

(72) Inventor: Wenjie Peng, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 737 days.

(21) Appl. No.: 17/511,786

(22) Filed: Oct. 27, 2021

(65) Prior Publication Data

US 2022/0053598 A1 Feb. 17, 2022

Related U.S. Application Data

(63) Continuation of application No. PCT/CN2020/085471, filed on Apr. 18, 2020.

(30) Foreign Application Priority Data

Apr. 28, 2019 (CN) ......................... 201910348522.3

(51) Int. Cl.
*H04L 5/00* (2006.01)
*H04W 24/02* (2009.01)
(Continued)

(52) U.S. Cl.
CPC ........... *H04W 76/30* (2018.02); *H04L 5/0053* (2013.01); *H04W 24/02* (2013.01); *H04W 36/00698* (2023.05)

(58) Field of Classification Search
None
See application file for complete search history.

(56) References Cited

U.S. PATENT DOCUMENTS

2016/0165499 A1 6/2016 Xu et al.
2017/0222876 A1 8/2017 Van Der Velde et al.
(Continued)

FOREIGN PATENT DOCUMENTS

CN 104885516 A 9/2015
CN 105451364 A 3/2016
(Continued)

OTHER PUBLICATIONS

NPL search IP.com.*
(Continued)

*Primary Examiner* — Jay P Patel
*Assistant Examiner* — Shehab A Alawdi
(74) *Attorney, Agent, or Firm* — Fish & Richardson P.C.

(57) ABSTRACT

This application provides example communication methods, example communication apparatuses, example computer storage mediums, and example communication systems. One example method includes receiving, by a master node, a first message from a secondary node, where the first message is used to release the secondary node, and where the first message includes a current configuration of a terminal at the secondary node. The master node can then generate a delta configuration for the terminal based on the current configuration. The master node can then send the delta configuration to the terminal.

18 Claims, 12 Drawing Sheets

(51) Int. Cl.
*H04W 36/00* (2009.01)
*H04W 76/30* (2018.01)

(56) References Cited

U.S. PATENT DOCUMENTS

| | | | | |
|---|---|---|---|---|
| 2018/0083688 | A1* | 3/2018 | Agiwal | H04W 76/19 |
| 2019/0053292 | A1* | 2/2019 | Ali | H04W 88/06 |
| 2019/0059124 | A1 | 2/2019 | Wu | |
| 2019/0069335 | A1* | 2/2019 | Wu | H04W 28/0252 |
| 2019/0253966 | A1* | 8/2019 | Park | H04W 52/0209 |
| 2019/0357292 | A1* | 11/2019 | Cirik | H04L 5/0053 |
| 2019/0357300 | A1* | 11/2019 | Zhou | H04L 5/0094 |
| 2020/0008100 | A1* | 1/2020 | Peng | H04W 28/088 |
| 2020/0029316 | A1* | 1/2020 | Zhou | H04W 52/0206 |
| 2020/0296637 | A1* | 9/2020 | Teyeb | H04L 5/001 |
| 2020/0351968 | A1* | 11/2020 | Yilmaz | H04W 36/0069 |
| 2020/0389823 | A1* | 12/2020 | Xu | H04W 76/15 |
| 2021/0219193 | A1* | 7/2021 | Teyeb | H04W 76/30 |

FOREIGN PATENT DOCUMENTS

| | | | |
|---|---|---|---|
| CN | 106063360 | A | 10/2016 |
| CN | 106538034 | A | 3/2017 |
| CN | 106941733 | A | 7/2017 |
| CN | 107113904 | A | 8/2017 |
| CN | 108633018 | A | 10/2018 |
| CN | 109150451 | A | 1/2019 |
| CN | 109151870 | A | 1/2019 |
| CN | 109246844 | A | 1/2019 |
| CN | 109391951 | A | 2/2019 |
| CN | 109547176 | A | 3/2019 |
| CN | 109548095 | A | 3/2019 |
| EP | 3413625 | A1 | 12/2018 |
| WO | 2016112970 | A1 | 7/2016 |

OTHER PUBLICATIONS

3GPP, Universal Mobile Telecommunication system (UMTS); LTE; 5G;NR; Multi-connectiviey; Overall description; Stage-2, Sep. 2018, ETSI, Version 15.2.0 Release 15, p. 17-18 and 21-22.*

Ericsson, "Full configuration in EN-DC," 3GPP TSG-RAN WG2 #100, R2-1713390, Reno USA, Nov. 27-Dec. 1, 2017, 6 pages.

Extended European Search Report issued in European Application No. 20799067.2 on Apr. 26, 2022, 12 pages.

Huawei, "Handling of the SN terminated bearer upon resume procedures," 3GPP TSG-RAN WG2 #103bis, R3-191605, Xi'an, China, Apr. 8-12, 2019, 4 pages.

3GPP TS 36.423 V15.5.0 (Mar. 2019), "3rd Generation Partnership Project; Technical Specification Group Radio Access Network; Evolved Universal Terrestrial Radio Access Network (E-UTRAN); X2 application protocol (X2AP)(Release 15)," Mar. 2019, 414 pages.

3GPP TS 37.340 V15.3.0 (Mar. 2019), "3rd Generation Partnership Project; Technical Specification Group Radio Access Network; Evolved Universal Terrestrial Radio Access (E-UTRA) and NR; Multi-connectivity; Stage 2 (Release 15)," Mar. 2019, 59 pages.

3GPP TS 37.340 V15.5.0 (Mar. 2019), "3rd Generation Partnership Project; Technical Specification Group Radio Access Network; Evolved Universal Terrestrial Radio Access (E-UTRA) and NR; Multi-connectivity; Stage 2(Release 15)," Mar. 2019, 68 pages.

3GPP TS 38.331 V15.5.1 (Apr. 2019), "3rd Generation Partnership Project; Technical Specification Group Radio Access Network; NR; Radio Resource Control (RRC) protocol specification(Release 15)," Apr. 2019, 491 pages.

Ericsson, "Data forwarding aspects for DC bearer type change and QoS flow offloading," 3GPP TSG-RAN WG3 NR AH 1807 Meeting, R3-184066, Montreal, Canada, Jul. 2-6, 2018, 3 pages.

Huawei, HiSilicon, "Delta configuration support for SN release" 3GPP TSG-RAN WG2 Meeting#106, R2-1907513, Reno, Nevada, USA, May 13-17, 2019, 5 pages.

Huawei, HiSilicon, "TP to 37.340 for NR-NR DC," 3GPP TSG-RAN WG2 103, R2-1811712, Gothenburg, Sweden, Aug. 20-24, 2018, 47 pages.

Office Action issued in Chinese Application No. 201910348522.3 on Mar. 30, 2021, 15 pages (with English translation).

Office Action issued in Chinese Application No. 201910348522.3 on Oct. 19, 2021, 6 pages.

PCT International Search Report and Written Opinion issued in International Application No. PCT/CN2020/085471 on Jun. 29, 2020, 20 pages (with English translation).

* cited by examiner

COMMUNICATION METHOD, COMMUNICATION APPARATUS, COMPUTER STORAGE MEDIUM, AND COMMUNICATION SYSTEM

CROSS-REFERENCE TO RELATED APPLICATIONS

This application is a continuation of International Patent Application No. PCT/CN2020/085471, filed on Apr. 18, 2020, which claims priority to Chinese Patent Application No. 201910348522.3, filed on Apr. 28, 2019. The disclosures of the aforementioned applications are hereby incorporated by reference in their entireties.

TECHNICAL FIELD

This application relates to the field of wireless communication, and in particular, to a communication method, a communication apparatus, a computer storage medium, and a communication system.

BACKGROUND

A next generation (NG) communication system can support shorter latency, larger bandwidth, and a large quantity of connections. In the next generation communication system, a dual connectivity (DC) technology is used to enable a terminal to separately obtain transmission resources from both a master node (MN) and a secondary node (SN), so that radio resource utilization is improved, and a transmission rate is increased.

A multi-RAT dual connectivity (MR-DC) architecture supports a plurality of bearer types, and different types of bearers may be determined based on whether a packet data convergence protocol (PCP) layer is anchored on the MN or the SN. In addition, a bearer type may change. When the bearer type changes, the MN needs to generate a full configuration for a terminal. This causes high signaling overhead and affects communication efficiency.

SUMMARY

Embodiments of this application provide a communication method, a communication apparatus, and a storage medium, to reduce signaling overheads when a bearer type changes in a DC scenario.

According to a first aspect, this application provides a communication method, including: master node receives a first message from a secondary node, where the first message is used to release the secondary node, and the first message includes a current configuration of a terminal at the secondary node. The master node generates a delta configuration for the terminal based on the current configuration. The master node sends the delta configuration to the terminal.

The master node and the secondary node provide a dual connectivity service for the terminal. The master node and the secondary node may be access network devices of a same standard or different standards.

In a possible implementation of the first aspect, the first message is a secondary node release request acknowledge message. In this implementation, before the master node receives the first message, the method further includes: The master node sends a secondary node release request message to the secondary node, where the secondary node release request message is used to indicate the secondary node to send the current configuration to the master node. This implementation is applicable to a scenario where the master node generates the delta configuration for the terminal in a secondary node release procedure triggered by the master node.

Optionally, the secondary node release request message includes first indication information, and the first indication information is used to indicate the secondary node to send the current configuration to the master node. Alternatively, after receiving the secondary node release request message, the secondary node may send the current configuration to the master node, and the secondary node release request message may not carry the first indication information. Alternatively, the secondary node may independently determine whether to send the current configuration of the terminal to the master node, for example, determine whether to send the current configuration of the terminal to the master node based on a historical request of the master node for the current configuration.

In a possible implementation of the first aspect, the first message is a secondary node release required message. Optionally, the secondary node may independently determine whether to send the current configuration of the terminal at the secondary node to the master node. This implementation is applicable to a scenario where the master node generates the delta configuration for the terminal in a secondary node release procedure triggered by the secondary node.

In a possible implementation of the first aspect, the master node sends a secondary node modification request message including second indication information to the secondary node, where the second indication information is used to request the secondary node to send the current configuration of the terminal at the secondary node to the master node. Correspondingly, the master node receives a secondary node modification request acknowledge message including the current configuration from the secondary node.

In a possible implementation of the first aspect, that the master node determines a delta configuration for the terminal based on the current configuration includes: The master node determines to modify all the current configuration or a portion of the current configuration, where the delta configuration includes all the modified configuration or the portion of the modified configuration. The master node may determine to retain a portion of the current configuration and modify another portion of the configuration, so that signaling overheads are reduced.

According to a second aspect, an embodiment of this application provides a communication method, including: A secondary node sends a first message to a master node, where the first message is used to release the secondary node, the first message includes a current configuration of a terminal at the secondary node, and the current configuration is used to generate a delta configuration for the terminal.

In a possible implementation of the second aspect, the method further includes: The secondary node generates the first message.

In a possible implementation of the second aspect, the first message is a secondary node release request acknowledge message. In this implementation, the method further includes: The secondary node receives a secondary node release request message from the master node, where the secondary node release request message is used to indicate the secondary node to send the current configuration to the master node.

Optionally, the secondary node release request message includes first indication information, and the first indication information is used to indicate the secondary node to send the current configuration to the master node.

In a possible implementation of the second aspect, the secondary node receives, from the master node, a secondary node modification request message including second indication information, where the second indication information is used to request the secondary node to send the current configuration of the terminal at the secondary node to the master node. Correspondingly, the secondary node sends a secondary node modification request acknowledge message including the current configuration to the master node.

In a possible implementation of the second aspect, the first message is a secondary node release required message.

According to a third aspect, an embodiment of this application provides a communication method, including: A terminal receives a delta configuration from a master node, where the delta configuration is determined by the master node based on a current configuration of the terminal at a secondary node. The terminal performs the delta configuration.

In a possible implementation of the third aspect, that the terminal performs the delta configuration includes: The terminal uses the delta configuration for bearer reconfiguration. The bearer reconfiguration includes changing a bearer of the terminal from a secondary node terminated bearer to a master node terminated bearer.

In any one of the foregoing aspects, the current configuration includes a packet data convergence protocol (PDCP) configuration of a secondary node terminated bearer, or includes the PDCP configuration and a service data adaptation protocol (SDAP) configuration of the secondary node terminated bearer.

According to the foregoing communication method, the master node receives the current configuration of the terminal at the secondary node from the secondary node, and generates the delta configuration for the terminal based on the current configuration. In this way, in a secondary node release process, when a bearer of the terminal changes from a secondary node terminated bearer to a master node terminated bearer, the master node does not need to generate a full configuration for the terminal, so that signaling overheads are reduced, and communication efficiency is improved.

According to a fourth aspect, an embodiment of this application provides a communication method, including: A first master node sends a secondary node addition request message to a secondary node, where the secondary node addition request message indicates the secondary node to provide a full configuration for a terminal. The first master node receives the full configuration from the secondary node.

In a possible implementation of the fourth aspect, the secondary node addition request message includes first indication information, and the first indication information is used to indicate the secondary node to provide the full configuration for the terminal.

Optionally, the first indication information is used to indicate that the first master node determines to perform the full configuration (fullConfig) for the terminal. Because the first master node determines to perform the full configuration for the terminal, after receiving a full configuration indication sent by the first master node, the terminal releases all common configurations and some dedicated configurations of a secondary node established bearer, and further obtains a new full configuration from a network side and performs the full configuration. Therefore, after the secondary node receives the first indication information indicating that the first master node performs the full configuration for the terminal, the secondary node may determine to generate the full configuration for the terminal.

In a possible implementation of the fourth aspect, the method further includes: The first master node receives a handover request message from a second master node, where the handover request message includes a configuration of the terminal at the second master node, an identifier of the secondary node, and an interface identifier allocated by the secondary node to the terminal.

The first master node sends a handover request acknowledge message including the full configuration to the second master node. The first master node is a target master node, and the second master node is a source master node. An accessed master node/a residential master node of the terminal is handed over from the second master node to the first master node through master node handover.

Optionally, in this implementation, the secondary node addition request message includes the interface identifier and the first indication information. By transmitting the interface identifier, the secondary node may remain unchanged in a master node handover process.

Optionally, when the first master node determines not to perform the full configuration for the terminal, the secondary node addition request message includes the interface identifier. Alternatively, when the first master node determines to initiate a full configuration procedure for the terminal, the secondary node addition request message does not include the interface identifier. If the first master node determines to generate the full configuration indication, the terminal may not release a configuration of a secondary node established bearer. Then, the secondary node receiving the interface identifier understands that the secondary node is used as a source secondary node in the master node handover process. Therefore, the secondary node may perform a delta configuration for the terminal. Conversely, if the first master node determines not to initiate the full configuration procedure, the interface identifier is not sent, so that the secondary node can understand only that the first master node is used as a target secondary node in the master node handover process, and generates the full configuration for the terminal.

In a possible implementation of the fourth aspect, that the target master node receives the full configuration from the secondary node includes: The target master node receives, from the secondary node, an acknowledge message in response to the secondary node addition request message, where the acknowledge message includes the full configuration.

According to a fifth aspect, an embodiment of this application provides a communication method, including: A secondary node receives a secondary node addition request message from a first master node, where the secondary node addition request message indicates the secondary node to provide a full configuration for a terminal. The secondary node sends the full configuration to the first master node. In a possible implementation of the fifth aspect, the method further includes: The secondary node determines the full configuration based on the secondary node addition request message.

In a possible implementation of the fifth aspect, the secondary node addition request message includes first indication information, and the first indication information is used to indicate the secondary node to provide the full configuration for the terminal.

Optionally, the first indication information is used to indicate the first master node to perform the full configuration for the terminal.

In a possible implementation of the fifth aspect, the secondary node addition request message includes an interface identifier allocated by a second master node to the terminal and the first indication information. By transmitting the interface identifier, the secondary node may remain unchanged in a master node handover process. The first master node is a target master node, and the second master node is a source master node.

According to a sixth aspect, an embodiment of this application provides a communication method, including: A second master node sends a handover request message to a first master node, where the handover request message includes a configuration of a terminal at the second master node, an identifier of a secondary node, and an interface identifier allocated by the secondary node to the terminal. The second master node receives, from the first master node, a configuration provided by the secondary node for the terminal.

Optionally, the full configuration is included in a handover request acknowledge message.

According to a seventh aspect, an embodiment of this application provides a communication method, including: A terminal receives a full configuration from a first master node, where the full configuration is provided by a secondary node for the terminal. The terminal performs the full configuration.

According to the foregoing communication method, in an inter-base-station handover or intra-base-station handover process, the secondary node may provide the full configuration for the terminal, to avoid affecting a configuration procedure between the secondary node and the terminal because the secondary node provides only a delta configuration, maintain normal communication between the terminal and the secondary node, and improve communication quality.

According to an eighth aspect, an embodiment of this application provides a communication apparatus. The apparatus has a function of implementing a behavior of the terminal in the communication method according to the third aspect or the seventh aspect. The function may be implemented by hardware, or may be implemented by hardware executing corresponding software. The hardware or the software includes one or more units or means corresponding to the foregoing function.

In a possible design, the apparatus includes a processor. The processor is configured to support the apparatus in performing a corresponding function of the terminal in the foregoing communication method. The apparatus may further include a memory. The memory may be coupled to the processor, and the memory stores program instructions and data that are necessary for the apparatus. Optionally, the apparatus further includes a transceiver. The transceiver is configured to support communication between the apparatus and a network element such as a relay device or an access network device. The transceiver may be an independent receiver, an independent transmitter, or a transceiver integrating a sending function and a receiving function.

In a possible implementation, the communication apparatus may be a terminal, or a component, for example, a chip, a chip system, or a circuit, that can be used in the terminal.

According to a ninth aspect, an embodiment of this application provides a communication apparatus. The apparatus has a function of implementing a behavior of the master node or secondary node in the communication method according to any one of the first aspect, the second aspect, the fourth aspect, the fifth aspect, and the sixth aspect. The function may be implemented by hardware, or may be implemented by hardware executing corresponding software. The hardware or the software includes one or more units or means corresponding to the foregoing function.

In a possible design, the apparatus includes a processor. The processor is configured to support the apparatus in performing a corresponding function of the access network device in the foregoing communication method. The apparatus may further include a memory. The memory may be coupled to the processor, and the memory stores program instructions and data that are necessary for the apparatus.

In a possible implementation, the communication apparatus may be an access network device, for example, a base station, or a component that can be used for the access network device, for example, a chip, a chip system, or a circuit.

Optionally, the apparatus further includes a transceiver. The transceiver may be configured to: support communication between the access network device and a terminal, and send information or instructions in the foregoing communication method to the terminal. The transceiver may be an independent receiver, an independent transmitter, or a transceiver integrating a sending function and a receiving function.

According to a tenth aspect, an embodiment of this application provides a communication system, including the master node, the secondary node, and the terminal according to the foregoing aspects.

According to an eleventh aspect, an embodiment of this application provides a computer-readable storage medium. The computer-readable storage medium stores instructions. When the instructions are run on a computer, the computer is enabled to perform the communication method according to any one of the foregoing aspects.

According to twelfth aspect, an embodiment of this application provides a computer program product including instructions. When the computer program product runs on a computer, the computer is enabled to perform the communication method according to any one of the foregoing aspects.

BRIEF DESCRIPTION OF DRAWINGS

To describe technical solutions in embodiments of this application more clearly, the following briefly describes the accompanying drawings for describing the embodiments. It is clear that the accompanying drawings in the following descriptions show merely some embodiments of this application, and a person of ordinary skill in the art may further derive other accompanying drawings from these accompanying drawings without creative efforts.

FIG. 2(*b*) is a schematic diagram of an LTE-NR dual connectivity scenario according to an embodiment of this application;

FIG. 2(*c*) is a schematic diagram of an LTE-NR dual connectivity scenario according to an embodiment of this application;

FIG. 2(*d*) is a schematic diagram of an LTE-NR dual connectivity scenario according to an embodiment of this application;

FIG. 3(*b*) is a schematic diagram of a wireless protocol architecture of dual connectivity according to an embodiment of this application;

DESCRIPTION OF EMBODIMENTS

Figure 1:
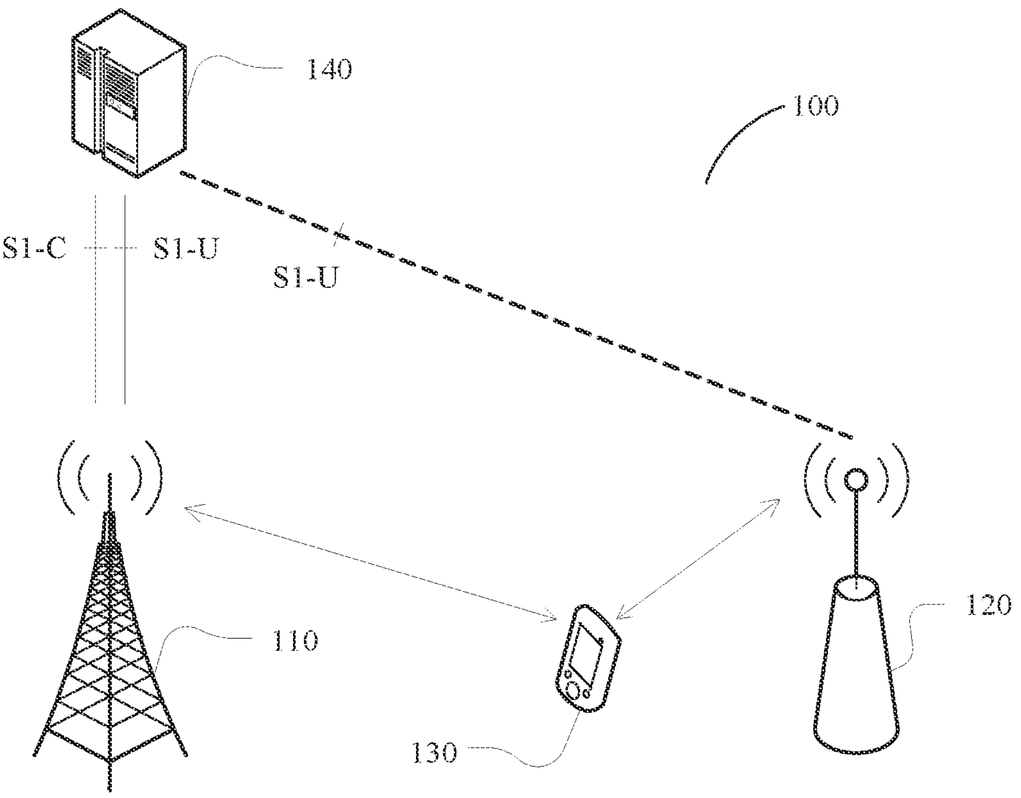
FIG. 1 is a schematic diagram of a communication system 100 according to an embodiment of this application.
Figure 2A:
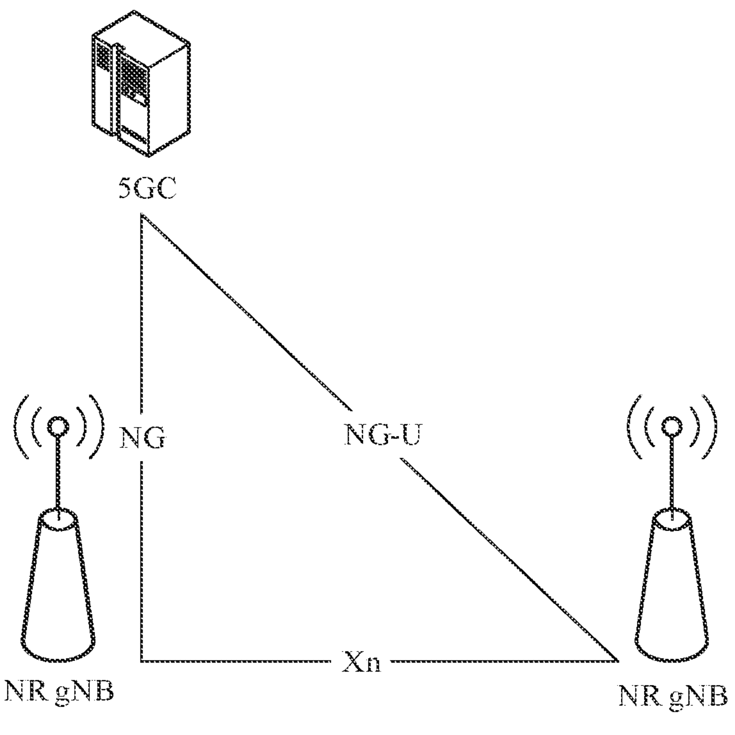
FIG. 2(*a*) is a schematic diagram of an NR-NR dual connectivity scenario according to an embodiment of this application.
Figure 2B:
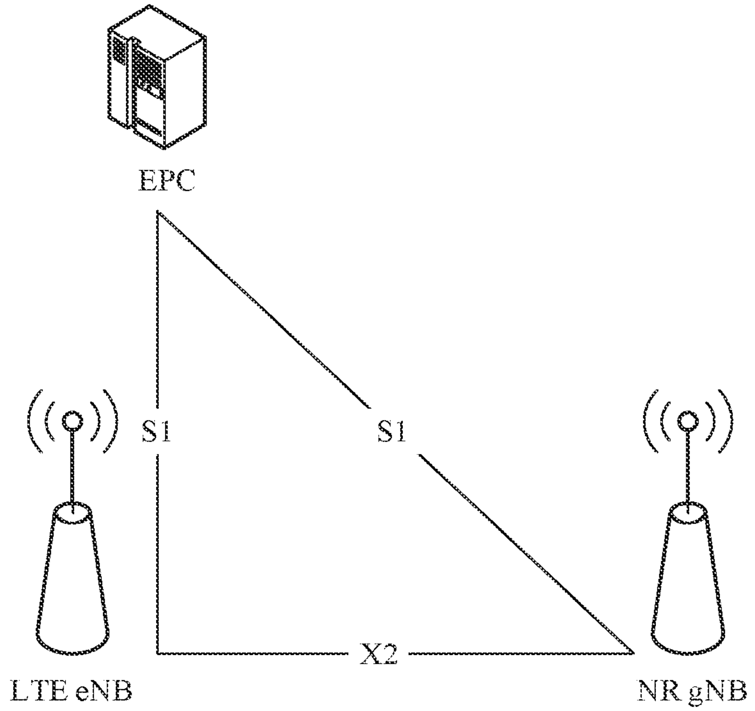
Figure 2C:
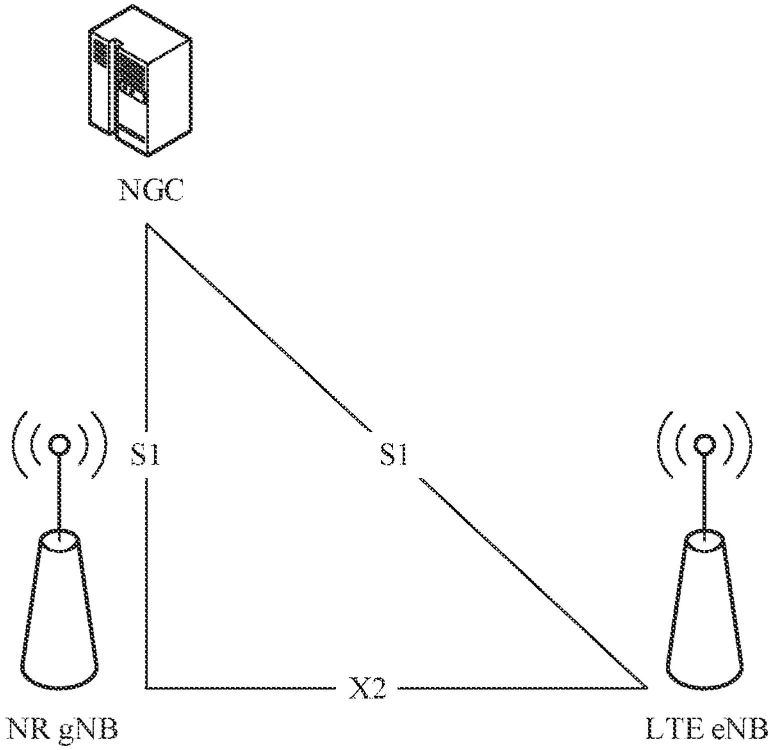
Figure 2D:
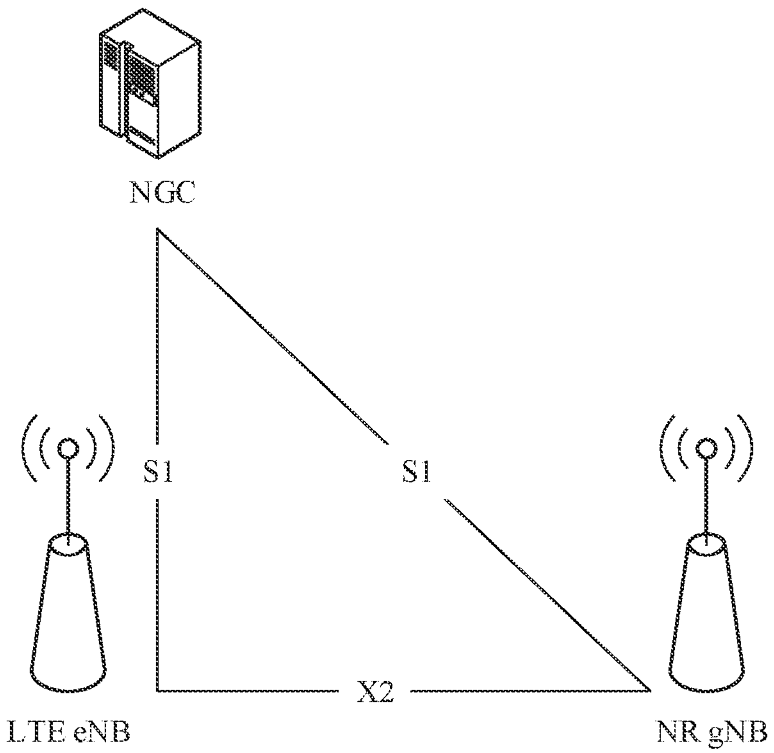

FIG. 1 is a schematic diagram of a communication system 100 according to an embodiment of this application. As shown in FIG. 1, a terminal 130 supports dual connectivity (DC), and an access network device 110 and an access network device 120 jointly serve the terminal 130. The access network device 110 is a master node (MN), and the access network device 120 is a secondary node (SN). The MN 110 has a control plane connection and a user plane connection to a core network (CN) 140. The SN 120 may or may not have a user plane connection to the core network 140. S1-U represents a user plane connection, and S1-C represents a control plane connection. When the SN 120 does not have a user plane connection to the core network 140, data of the terminal 130 may be offloaded by the MN 110 to the SN 120 at a packet data convergence protocol (PDCP) layer. The MN may also be referred to as a master base station or a master access network device, and the SN may also be referred to as a secondary base station or a secondary access network device.

In this application, the terminal 130 may be a device of various types that provides a user with voice and/or data connectivity, for example, may be a handheld device having a wireless connection function, or a processing device connected to a wireless modem. The terminal may communicate with a core network by using an access network such as a radio access network (RAN), and exchange voice and/or data with the RAN. The terminal may include user equipment (UE), a wireless terminal, a mobile terminal, a subscriber unit, a subscriber station, a mobile station, a remote station, an access point (AP), a remote terminal, an access terminal, a user terminal, a user agent, a user device, or the like. The terminal may include, for example, a mobile phone (or referred to as a "cellular" phone), a computer with a mobile terminal, a portable, pocket-sized, handheld, computer built-in, or vehicle-mounted mobile apparatus, or a smart wearable device. For example, the terminal is a device such as a personal communications service (PCS) phone, a cordless phone, a session initiation protocol (SIP) phone, a wireless local loop (WLL) station, a personal digital assistant (PDA), a smart band, or a smart watch. The terminal may be a limited device, for example, a device having low power consumption, a device having a limited storage capability, or a device having a limited computing capability. For example, the terminal is an information sensing device, for example, a terminal having a barcode, radio frequency identification (RFID), a sensor, a global positioning system (GPS), or a laser scanner. In addition, the terminal 130 may alternatively be an unmanned aerial vehicle device. In some embodiments of this application, a chip used in the foregoing device may also be referred to as a terminal.

The communication system in this application may be a long term evolution (LTE) wireless communication system, a 5th generation (5G) mobile communication system such as a new radio (NR) system, or another next generation (NG) communication systems, or the like. This is not limited in this application.

In this application, the access network device 110 and the access network device 120 may be base stations defined by the 3rd generation partnership project (3GPP). For example, the access network device 110 and the access network device 120 each may be a base station device in the LTE system, namely, an evolved node B (eNB/eNodeB), or may be an access network side device in the NR system, including a gNB, a transmission point (TRP), and the like. The access network device 110 or the access network device 120 may include a central unit (CU) and a distributed unit (DU). The CU may also be referred to as a control unit. A CU-DU structure may be used to split protocol layers of a base station. Functions of some protocol layers are distributed in the CU for centralized control, and functions of some or all of remaining protocol layers are distributed in the DU. The CU centrally controls the DU. In addition, when the eNB accesses an MR core network, which may be referred to as a next generation core network (NGC) or a 5G core network (5GC), air LTE eNB may also be referred to as an eLTE eNB. Specifically, the eLTE eNB is an evolved LTE base station device based on the LTE eNB, and may be directly connected to the 5G CN. The eLTE eNB also belongs to a base station device in NR. The access network device 110 or the access network device 120 may alternatively be a wireless terminal (WT), for example, an access point (AP), an access controller (AC), or another network device, for example, a relay device, a vehicle-mounted device, or an intelligent wearable device, that has a capability of communicating with a terminal and the core network. A type of a network device is not limited in the embodiments of this application.

Dual connectivity may be implemented between access network devices of a same standard. As shown in FIG. 2(*a*), in an NR standalone scenario, both the MN 110 and the SN 120 are NR gNBs, and there is an Xn interface between the MN 110 and the SN 120. There is an NG interface between the MN 110 and the NGC, and there is at least a control plane connection, and there may further be a user plane connection. There is an NG-U interface between the SN 120 and the 5GC, that is, there may be only a user plane connection. The NGC may include function entities such as a mobility management function (access and mobility management function, AMF) network element and a user plane function (UPF) network element.

Dual connectivity may also be implemented between access network devices of different standards, and may be referred to as a multi-RAT DC (MR-DC). The MN and the SN use different radio access technologies (RAT). For example, dual connectivity may be implemented in a scenario of joint networking of LTE and NR, and is referred to as LTE-NR dual connectivity, so that the terminal may obtain radio resources from both LTE and NR air interfaces to perform data transmission. This increases a transmission rate. The LTE-NR dual connectivity mainly includes the following three architectures, which are described below with reference to FIG. 2(*b*), FIG. 2(*c*), and FIG. 2(*d*).

FIG. 2(*b*) is a schematic diagram of an LTE-NR dual connectivity scenario according to an embodiment of this application. As shown in FIG. 2(*b*), an LTE eNB serves as the MN 110, and an NR gNB serves as the SN 120. There is an X2 interface between the LTE eNB and the NR gNB. There is an S1 interface between the LTE eNB and an evolved packet core (EPC) of an LTE system, there is at least a control plane connection, and there may further be a user plane connection. There is an S1-U interface between the NR gNB and the EPC, that is, there may be only a user plane connection, it can be learned that in the scenario shown in FIG. 2(*b*), the LIE eNB is used as an anchor, and the LTE eNB accesses the LTE core network.

FIG. 2(*c*) is a schematic diagram of another LTE-NR dual connectivity scenario according to an embodiment of this application. A difference from FIG. 2(*b*) is that an NR gNB is used as an anchor, the NR gNB accesses an NGC, the NR gNB serves as the MN, there is an NG interface between the NR gNB and the NGC, and a control plane connection and a user plane connection may be established for the terminal. An LTE eNB serves as the SN, there is only an NG-U interface between the LTE eNB and the NGC, and only a user plane connection is established.

FIG. 2(*d*) is a schematic diagram of still another LTE-NR dual connectivity scenario according to an embodiment of this application. Similar to FIG. 2(*b*), in FIG. 2(*d*), an LTE eNB is used as an anchor, and a difference lies in that the LTE eNB accesses an NGC. To be specific, the eNB serves as the MN, there is an NG interface between the DE eNB and the NGC, and a control plane connection and a user plane connection may be established for the terminal. An NR gNB serves as the SN, there is an interface between the NR gNB and the NGC, and only a user plane connection is established.

In the foregoing four scenarios, no user plane connection may be established between the SN and the core network, but data is transferred via the MN. For example, in a downlink direction, data of the terminal first arrives at the MN, and the MN offloads the data of the terminal to the SN at a PDCP layer. A form of the offloaded data is, for example, a PDCP protocol data unit (PDU).

In dual connectivity, a data radio bearer (DRB) established between a terminal and an access network side may be independently provided by an MN or an SN, or may be provided by both the MN and the SN. When provided only by the MN, the DRB is referred to as a master cell group (MCG) bearer, where an MCG is a cell managed by at least one MN configured to provide an air interface resource for the terminal. When provided only by the SN, the DRB is referred to as a secondary cell group (SCG) bearer, where an SCG is a cell managed by at least one SN configured to provide an air interface resource for the terminal. In addition, the DRB provided by both the MN and the SN is referred to as a split bearer.

Figure 3A:
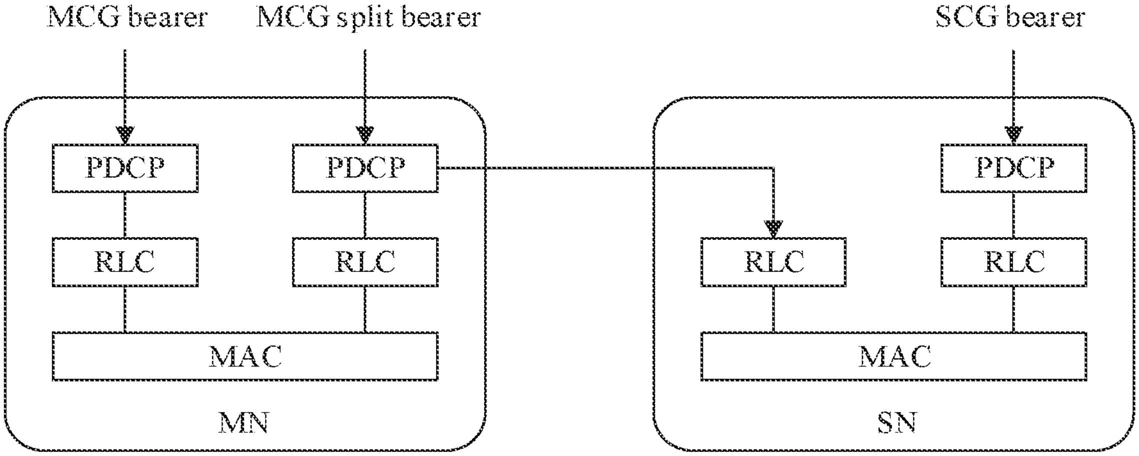
FIG. 3(*a*) is a schematic diagram of a wireless protocol architecture of dual connectivity according to an embodiment of this application.
Figure 3B:
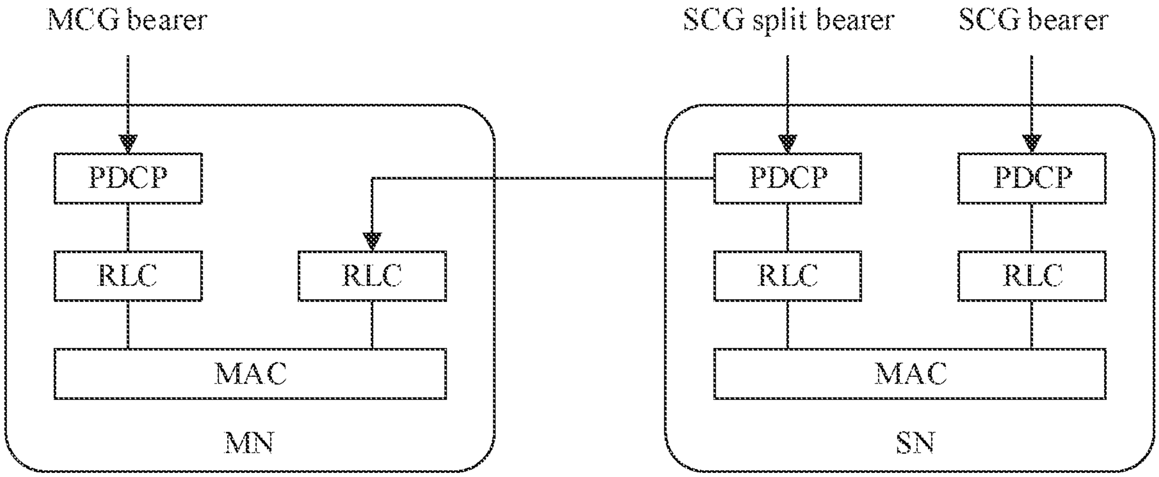

Descriptions are provided below with reference to FIG. 3(*a*) and FIG. 3(*b*). FIG. 3(*a*) and FIG. 3(*b*) are each a schematic diagram of a wireless protocol architecture of dual connectivity according to an embodiment of this application. As shown in FIG. 3(*a*) and FIG. 3(*b*), when a bearer is provided only by an MN, that is, data flows are transmitted only from a core network to the MN, the bearer is an MCG bearer. When a bearer is provided only by an SN, that is, data flows are transmitted only from a core network to the SN, the bearer is an SCG bearer. When a bearer is provided by both an MN and an SN, that is, when data flows are offloaded at the MN or the SN, the bearer is a split bearer. For distinction, when data flows are offloaded at the MN, the bearer may be referred to as an MCG split bearer (as shown in FIG. 3(*a*)); when data flows offloaded at the SN, the bearer may be referred to as an SCG split bearer (as shown in FIG. 3(*b*)).

Depending on whether a PDCP entity is established at the MN or SN, bearers in the DC may be classified into the following types:

an MN terminated MCG bearer, an MN terminated SCG bearer, an MN terminated split bearer, an SN terminated MCG bearer, an SN terminated. SCG bearer, and an SN terminated split bearer, where for an MN terminated bearer, the PDCP entity is established at the MN, and a user plane connection to the core network is terminated at the MN; and for an SN terminated bearer, the PCP entity is established at the SN, and a user plane connection to the core network is terminated at the SN.

In a process of dual connectivity communication between the terminal 130 and the MN 110 and SN 120, if a communication environment changes, the foregoing bearer type may be changed. For example, an original bearer on the terminal 130 is an SN terminated bearer. Because quality of a communication link of the SN 120 deteriorates, the terminal 130 may release the SN 120, and change the bearer to an MN terminated bearer, that is, migrates an anchor from the SN 120 to the MN 110. To implement the foregoing bearer change, the MN 110 needs to configure the terminal 130. However, if a full configuration is generated, signaling overheads are high, and communication efficiency is low.

As defined in the embodiments of this application, a one-way communication link from an access network to a terminal is a downlink, data transmitted on the downlink is downlink data, and a transmission direction of the downlink data is referred to as a downlink direction; a one-way communication link from the terminal to the access network is an uplink, data transmitted on the uplink is uplink data, and a transmission direction of the uplink data is referred to as an uplink direction.

A resource in the embodiments of this application may also be referred to as a transmission resource, includes one or more of a time domain resource, a frequency domain resource, and a code channel resource, and may be used to carry data or signaling in an uplink communication process or a downlink communication process.

It should be understood that, the term "and/or" in this specification describes only an association relationship for describing associated objects and represents that three relationships may exist. For example, A and/or B may represent the following three cases: only A exists, both A and B exist, and only B exists. In addition, the character "/" in this specification indicates an "or" relationship between the associated objects.

It should be understood that in the embodiments of the present disclosure, "B corresponding to A" indicates that B is associated with A, and B may be determined based on A. However, it should be further understood that determining B based on A does not mean that B is determined based on only A. B may alternatively be determined based on A and/or other information.

In the embodiments of this application, "a plurality of" means two or more than two.

Descriptions such as "first", "second" in the embodiments of this application are merely used for indicating and distinguishing between described objects, do not show a sequence, do not indicate a specific limitation on a quantity of devices in the embodiments of this application, and do not constitute any limitation on the embodiments of this application.

In the embodiments of this application, "connection" means various connection manners such as a direct connection or an indirect connection, for implementing communication between devices. This is not limited in the embodiments of this application.

Unless otherwise specified, "transmission" (transmit/transmission) in the embodiments of this application refers to bidirectional transmission, and includes a sending action and/or a receiving action. Specifically, "transmission" in the embodiments of this application includes data sending, data receiving, or data sending and receiving. That is, data transmission herein includes uplink data transmission and/or downlink data transmission. Data may include a channel and/or a signal. Uplink data transmission is uplink channel transmission and/or uplink signal transmission, and downlink data transmission is downlink channel transmission and/or downlink signal transmission.

A service in the embodiments of this application is a communication service obtained by a terminal from a network side, and includes a control plane service and/or a data plane service, for example, a voice service or a data traffic service. The sending or receiving of the service includes sending or receiving of service-related data or signaling.

In the embodiments of this application, a "network" and a "system" express a same concept, and a communication system is a communication network.

It may be understood that in the embodiments of this application, the terminal and/or an access network device may perform some or all steps in the embodiments of this application. These steps or operations are merely examples. In the embodiments of this application, other operations or variations of various operations may be further performed. In addition, the steps may be performed in a sequence different from a sequence presented in the embodiments of this application, and not all the operations in the embodiments of this application may be performed.

Figure 4:
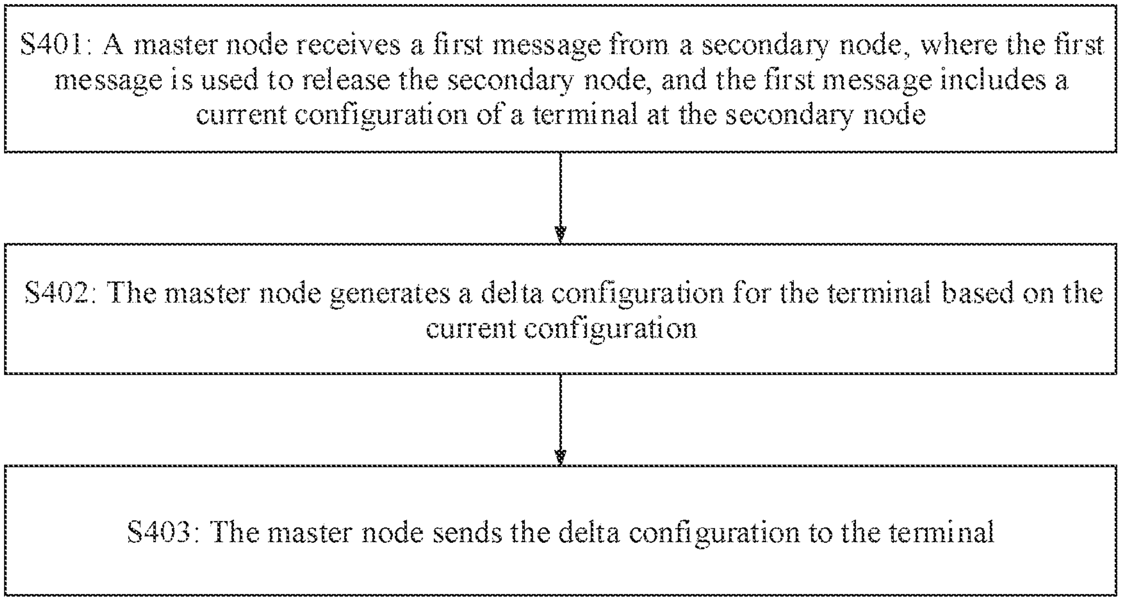
FIG. 4 is a schematic flowchart of a communication method according to an embodiment of this application.

FIG. 4 is a schematic flowchart of a communication method according to this application. The method may be applied to the communication system in FIG. 1. The method includes the following steps.

S401: A master node receives a first message from a secondary node, where the first message is used to release the secondary node, and the first message includes a current configuration of a terminal at the secondary node.

Correspondingly, the secondary node may determine the current configuration of the terminal at the secondary node, and send the first message including the current configuration to the master node.

The master node and the secondary node may be access network devices of different standards. For example, the master node is an MeNB, and the secondary node is an SgNB. Alternatively, the master node and the secondary node may be access network devices of a same standard. For example, the master node is an MgNB, and the secondary node is an SgNB. Before the secondary node is released, a bearer of the terminal may be established at the master node, or may be established at the secondary node. Therefore, the master node and the secondary node may separately provide a data transmission service for the terminal.

The current configuration of the terminal at the secondary node is a latest configuration of a bearer established at the secondary node before the secondary node is released, and may also be referred to as a configuration of the terminal configured at the secondary node currently. The bearer established at the secondary node may be a secondary node terminated bearer established between the terminal and the secondary node, and may include a bearer established at the secondary node by a PDCP entity. When a configuration related to the bearer is updated, the current configuration is the latest configuration. Specifically, the current configuration may include a PDCP configuration of the secondary node terminated bearer. The PDCP configuration may be, for example, one or more of an uplink PDCP sequence number length, a downlink PDCP sequence number length, a discard timer, a header compression configuration, a reordering timer, and an uplink offload threshold. Optionally, the related configuration further includes an SDAP configuration. The SDAP configuration may be, for example, one or more of a session identifier, whether a header is present for uplink data, whether a header is presented for downlink data, whether a default bearer is configured, and a flow-to-bearer mapping relationship. If a data anchor of the terminal is at the secondary node side, that is, the bearer of the terminal is the secondary node terminated bearer, the anchor is transferred from the secondary node side to the master node side through a secondary node release procedure. The bearer of the terminal changes to a master node terminated bearer or a master node established bearer.

S402: The master node generates a delta configuration for the terminal based on the current configuration.

Optionally, in an implementation, the master node determines to modify all the current configuration or a portion of the current configuration to generate the delta configuration. Correspondingly, the delta configuration includes all the modified configuration or the portion of the modified configuration. Specifically, the master node may determine whether the current configuration received from the secondary node includes a configuration parameter that can be reused in a master node terminated hearer to be established between the terminal and the master node. For the configuration parameter that can be reused, the master node does not need to modify the configuration parameter. In addition, because the terminal has obtained the foregoing current configuration in communication with the secondary node, and the terminal retains the configuration of the bearer, the master node also does not need to send the reused configuration parameter to the terminal. For a configuration parameter that cannot be reused or a configuration parameter that the master node considers to modify, the master node modifies the configuration parameter or generates a configuration parameter. The delta configuration may also be understood as a configuration manner, namely, a configuration manner in which original configurations are modified and all configurations do not need to be regenerated. A configuration parameter that can be reused and a configuration parameter that cannot be reused are not limited in this application, are determined by the master node, and may depend on an implementation algorithm of the master node.

For example, for the PDCP configurations such as the uplink PDCP sequence number length/downlink PDCP sequence number length and the discard timer, if considering that original configurations of the terminal at the secondary node can be reused, the master node may not provide a configuration to the terminal. Unless the terminal receives an explicit indication from a network side to release the retained configurations, the terminal may retain the configurations.

S403: The master node sends the delta configuration to the terminal.

Correspondingly, the terminal receives the delta configuration. Further, the terminal may perform the delta configuration and another configuration (for example, a reused configuration) stored by the terminal to perform bearer reconfiguration, including: the terminal changes a bearer in which the terminal is located from a secondary node established bearer to a master node established bearer. In other words, an anchor is transferred from the secondary node side to the master node side, and then the terminal may communicate with the master node by using the changed bearer, including obtaining a data transmission service from the master node.

According to the communication method provided in this embodiment of this application, in a secondary node release process, the master node receives the current configuration of the terminal at the secondary node from the secondary node, and generates the delta configuration for the terminal based on the current configuration. In this way, when the bearer of the terminal changes from the secondary node terminated bearer to the master node terminated bearer, the master node does not need to generate a full configuration for the terminal, so that signaling overheads are reduced, and communication efficiency is improved.

Figure 5:
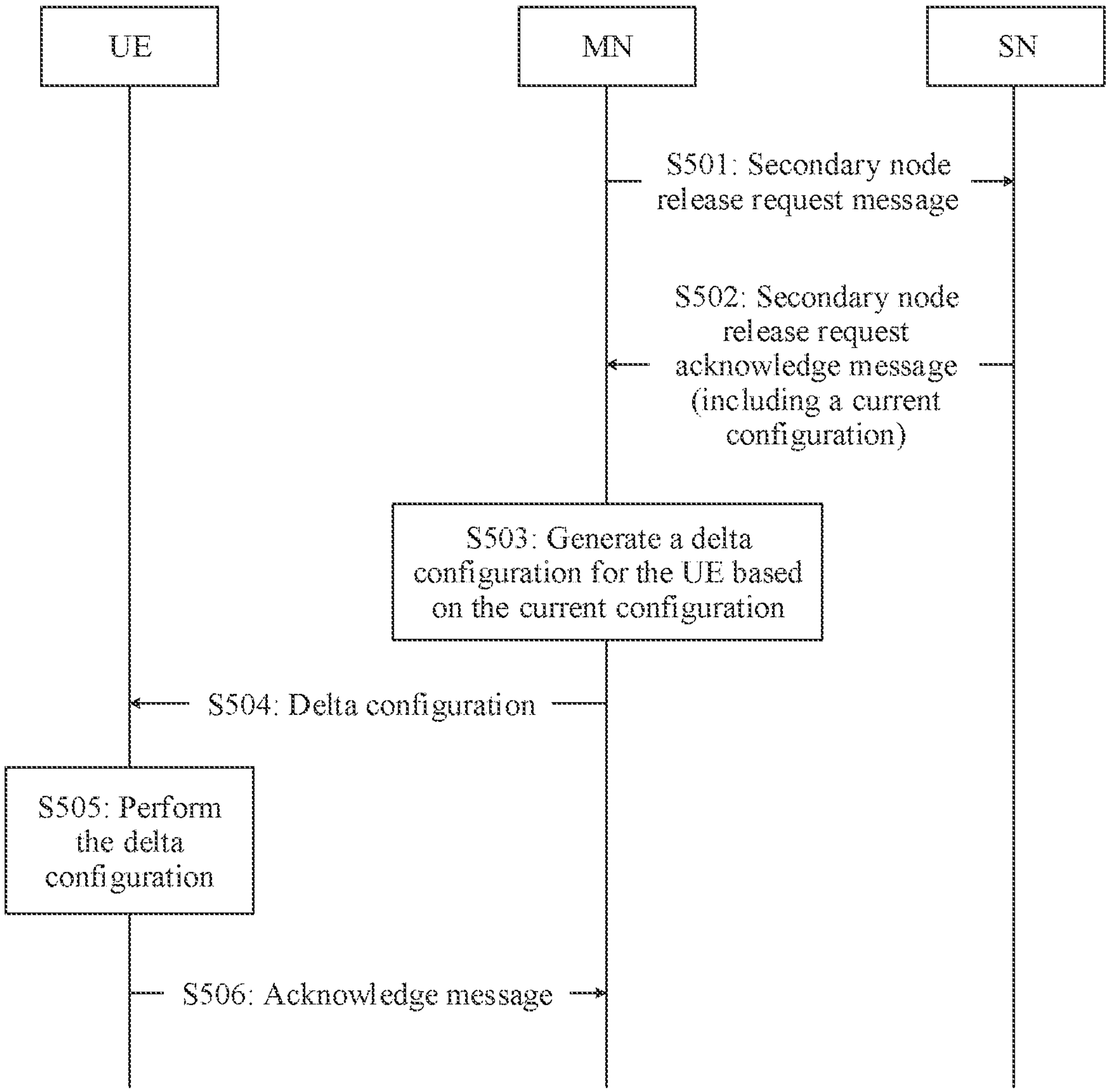
FIG. 5 is a schematic signaling flowchart of a communication method according to an embodiment of this application.
Figure 6:
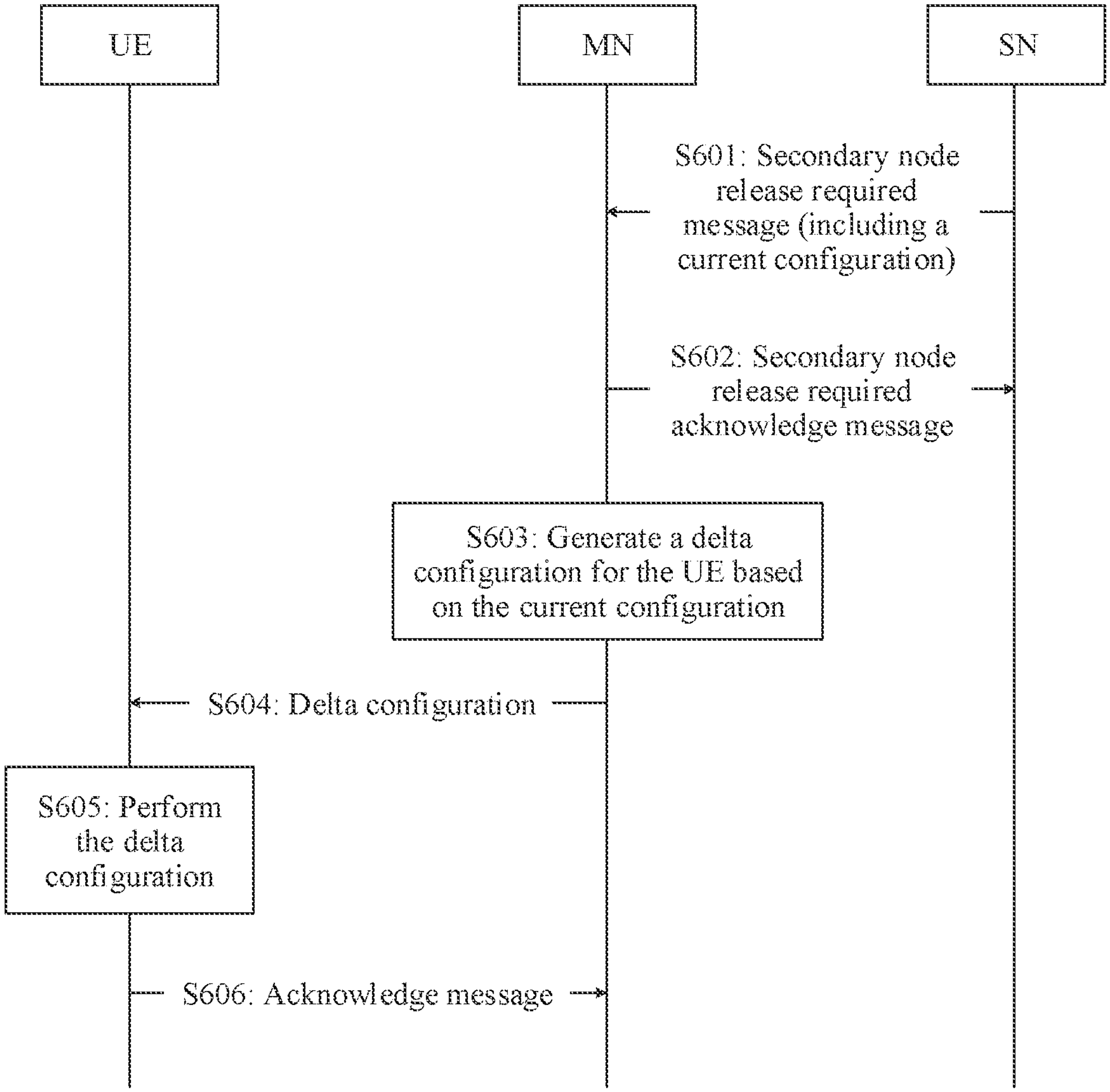
FIG. 6 is a schematic signaling flowchart of a communication method according to an embodiment of this application.
Figure 7:
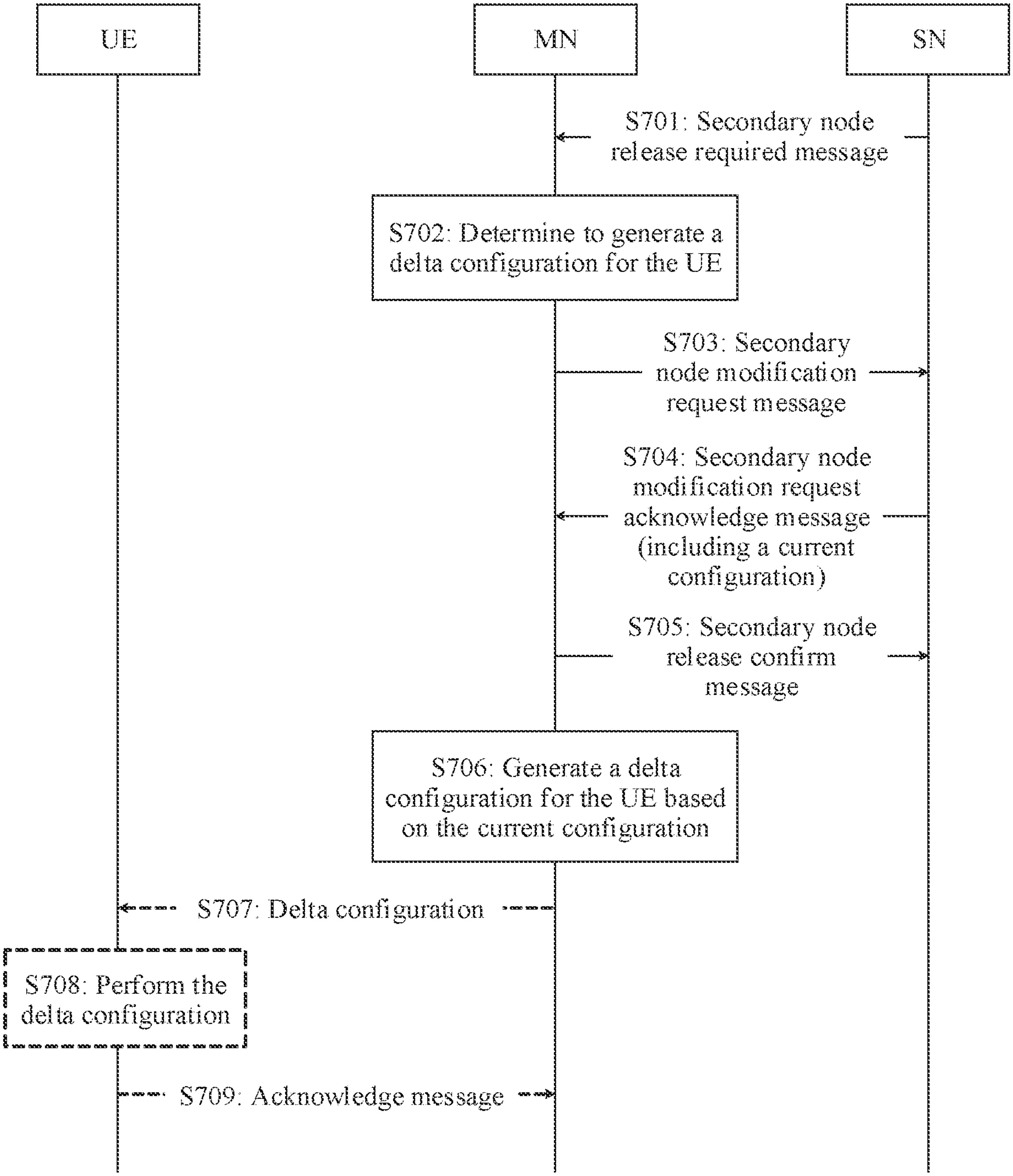
FIG. 7 is a schematic signaling flowchart of a communication method according to an embodiment of this application.

FIG. 5 to FIG. 7 each are a schematic signaling flowchart of a communication method according to an embodiment of this application. In FIG. 5 to FIG. 7, MN represents a master node, SN represents a secondary node, and UE represents a terminal. An implementation shown in FIG. 5 relates to an SN release procedure triggered by the MN. Implementations shown in FIG. 6 and FIG. 7 relate to an SN release procedure triggered by the SN. It may be understood that the implementations shown in FIG. 5 to FIG. 7 are based on the communication method shown in FIG. 4. Explanations and descriptions of the communication method provided by this application that are provided above are not described in detail again.

The communication method shown in FIG. 5 includes the following steps.

S501: The MN sends a secondary node release request message to the SN.

The secondary node release request message may also be referred to as a secondary base station release request message, for example, may be an SgNB release request message.

Optionally, in an implementation, the SN may be indicated in an explicit manner to send a current configuration of the UE at the SN to the MN. For example, the release request message includes indication information, and the indication information is used to indicate the SN to send the current configuration of the UE at the SN to the MN. Optionally, the indication information may indicate to the SN that the MN determines to generate a delta configuration for the SN. In this case, after obtaining the indication information, the SN may understand that the MN needs to obtain the current configuration of the UE at the SN to generate the delta configuration, and therefore determines to send the current configuration to the MN. Alternatively, the indication information may directly indicate the SN to send the current configuration to the MN. Once obtaining the indication information, the SN may send the current configuration to the MN. Optionally, the indication information may be a field, and the field includes one or more bits. For example, the indication information occupies one bit. When the bit is "1", it indicates that the SN sends the current configuration to the MN.

Optionally, in an implementation, the SN may be indicated in an implicit manner to send the current configuration of the UE at the SN to the MN. That is, the release request message may not include the indication information. For example, the SN may independently determine whether to send the current configuration of the UE at the SN to the MN. In a possible implementation, the SN may perform determining based on a historical request status of the MN for the current configuration. Specifically, if the MN has queried a configuration of the UE at the SN from the SN before initiating the secondary node release request message, and the SN provides the MN with a latest configuration, it indicates that the MN has obtained the latest configuration of the UE at the SN, and the SN may determine not to send the current configuration to the MN. Conversely, if the configuration of the UE at the SN is updated or the SN has never provided the configuration to the MN, the SN may determine to send the current configuration to the MN. For another example, after receiving the secondary node release request message, the SN includes the current configuration in a corresponding secondary node release request acknowledge message. Alternatively, when receiving the release request message, the SN sends the current configuration to the MN.

S502: The SN sends a secondary node release request acknowledge message to the MN, where the release request acknowledge message includes the current configuration of the UE at the SN.

The secondary node release request acknowledge message may also be referred to as a secondary base station release request acknowledge message, for example, may be an SgNB release request acknowledge message.

For detailed descriptions of the current configuration, refer to related content in the embodiment shown in FIG. 4. Details are not described again.

Correspondingly, the MN receives the secondary node release request acknowledge message.

S503: The MN generates the delta configuration for the UE based on the current configuration.

For a definition of the delta configuration and a generation manner, refer to related content in the embodiment shown in FIG. 4. Details are not described again.

S504: The MN sends the generated delta configuration to the UE.

The delta configuration may be included in a radio resource control (RRC) reconfiguration message.

Correspondingly, the UE receives the delta configuration.

S505: The UE performs the delta configuration.

Specifically, the UE may use the delta configuration for bearer reconfiguration.

S506: The UE sends an acknowledge message to the MN.

The acknowledge message may be an RRC reconfiguration complete message. The acknowledge message may be sent to indicate that the UE completes the bearer reconfiguration.

Through the bearer reconfiguration, a bearer of the UE changes from an SN established bearer to an MN established bearer. Then, the UE may perform data transmission with the MN by using the MN established bearer.

The communication method shown in FIG. 6 includes the following steps.

S601: The SN sends a secondary node release required message to the MN.

The SN triggers an SN release procedure by sending the secondary node release required message. The secondary node release required message may also be referred to as a secondary base station release required message, for example, may be an SgNB release required message.

The secondary node release required message includes a current configuration of the UE at the SN. For detailed descriptions of the current configuration, refer to related content in the embodiment shown in FIG. 4. Details are not described again.

Optionally, the SN may independently determine whether to send the current configuration of the UE at the SN to the MN. Refer to related descriptions in S301. Details are not described again.

Correspondingly, the MN receives the secondary node release required message, and obtains the current configuration of the UE at the SN.

S602: The MN sends a secondary node release required acknowledge message to the SN.

If the MN agrees to release the SN, the MN may send the acknowledge message to the SN. The secondary node release required acknowledge message may also be referred to as a secondary base station release required acknowledge message, for example, may be an SgNB release required acknowledge message.

S603: The MN generates a delta configuration for the UE based on the current configuration.

It may be understood that there is no limitation on an execution sequence between S602 and S603, and S602 may be performed before S603, S603 may be performed before S602, or S602 and S603 may be performed simultaneously. This is not specifically limited in this application.

S604: The MN sends the generated delta configuration to the LIE.

S605: The UE performs the delta configuration.

S606: The UE sends an acknowledge message to the MN.

For S603 to S606, refer to related descriptions of S503 to S506. Details are not described again.

In an implementation shown in FIG. 7, an SN release procedure triggered by the SN is combined with an SN modification procedure triggered by the MN, so that when the SN triggers the SN release procedure, the MN obtains a current configuration of the UE at the SN. As shown in FIG. 7, the communication method includes the following steps.

S701: The SN sends a secondary node release required message to the MN.

S702: The MN determines to generate a delta configuration for the UE.

Specifically, after receiving the SN release required message sent by the SN, the MN may determine whether to obtain a current configuration of the UE at the SN, that is, determine whether to perform the delta configuration on a bearer currently established at the SN. The bearer currently established at the SN includes a bearer established at the SN by a PDCP entity. If the MN determines to obtain the current configuration, the MN may trigger the SN modification procedure to obtain the current configuration. For example, if a bearer type changes, for example, changes from an SN terminated bearer to an MN terminated bearer, and the MN wants to perform the delta configuration on the changed bearer, the MN determines to obtain the current configuration of the UE at the SN.

S703: The MN sends a secondary node modification request message to the SN.

The secondary node modification request message includes indication information used to request the SN to provide the current configuration of the UE at the SN.

The secondary node modification request message may also be referred to as a secondary base station modification request message, for example, an SgNB modification request message.

S704: The SN sends a secondary node modification request acknowledge message including the current configuration to the MN.

Specifically, the SN sends the current configuration of the LE at the SN to the MN based on the indication information. The current configuration may be included in the secondary node modification request acknowledge message. The secondary node modification request acknowledge message may also be referred to as a secondary base station modification request acknowledge message, for example, an SgNB modification request acknowledge message.

S705: The MN sends a secondary node release confirm message to the SN.

Specifically, the MN receives the SN modification request acknowledge message sent by the SN, obtains the current configuration of the UE at the SN, and feeds back the secondary node release confirm message to the SN. The secondary node release confirm message may also be referred to as a secondary base station release confirm message, for example, an SgNB release confirm message.

S706: The MN generates a delta configuration for the UE based on the current configuration.

For detailed descriptions of the delta configuration, refer to related content in another embodiment of this application. Details are not described again.

It may be understood that there is no limitation on an execution sequence between S705 and S706, and S705 may be performed before S706, S706 may be performed before S705, or S705 and S706 may be performed simultaneously. This is not specifically limited in this application.

Optionally, the method further includes the following steps. S707: The MN sends the generated delta configuration to the UE.

S708: The UE performs the delta configuration.

S709: The UE sends an acknowledge message to the MN.

For S707 to S709, refer to related descriptions of S504 to S506. Details are not described again.

According to the foregoing communication method, in the secondary node release procedure triggered by the MN or the secondary node release procedure triggered by the SN, the MN may generate the delta configuration for the UE for bearer reconfiguration, so that signaling overheads are reduced, communication efficiency is improved, and application scenarios are extended.

To improve efficiency of dual connectivity communication, a terminal may remain a secondary node unchanged during master node handover. To be specific, a master node of the terminal is handed over from a source master node to a target master node. In addition, the secondary node of the terminal is not changed, or it may be understood that a source secondary node and a target secondary node are a same access network device. Because the secondary node remains unchanged, the secondary node can identify that the target master node establishes a context for the same terminal, that is, the secondary node knows that the secondary node is retained. Therefore, the secondary node may directly associate with a previous context to provide a delta configuration for the terminal. However, if standards of the target master node and the source master node are different, for example, the source master node is an LTE eNB and the target master node is an NR gNB, the target master node cannot understand a configuration of the source master node, and then the target master node indicates the terminal to perform a full configuration (fullConfig). The UE receiving a full configuration indication releases some dedicated configurations at the source secondary node. Therefore, if the target secondary node (the same as the source secondary node) generates the delta configuration for only the UE, the terminal cannot complete a configuration with the target secondary node, and a process of communication between the terminal and the target secondary node is affected.

Figure 8:
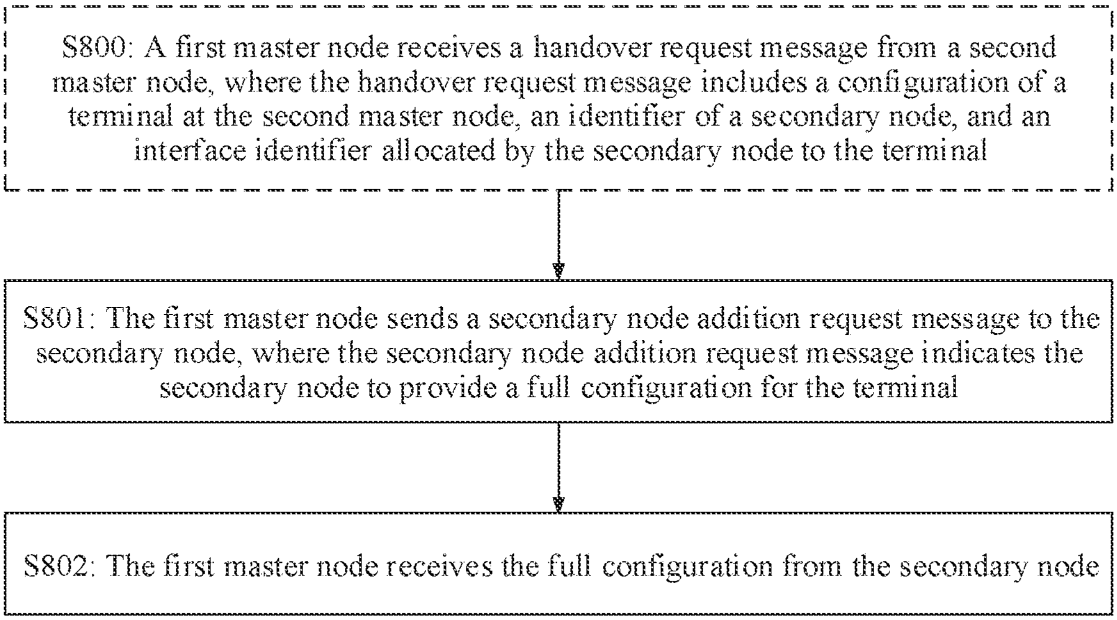
FIG. 8 is a schematic flowchart of another communication method according to an embodiment of this application.
Figure 9:
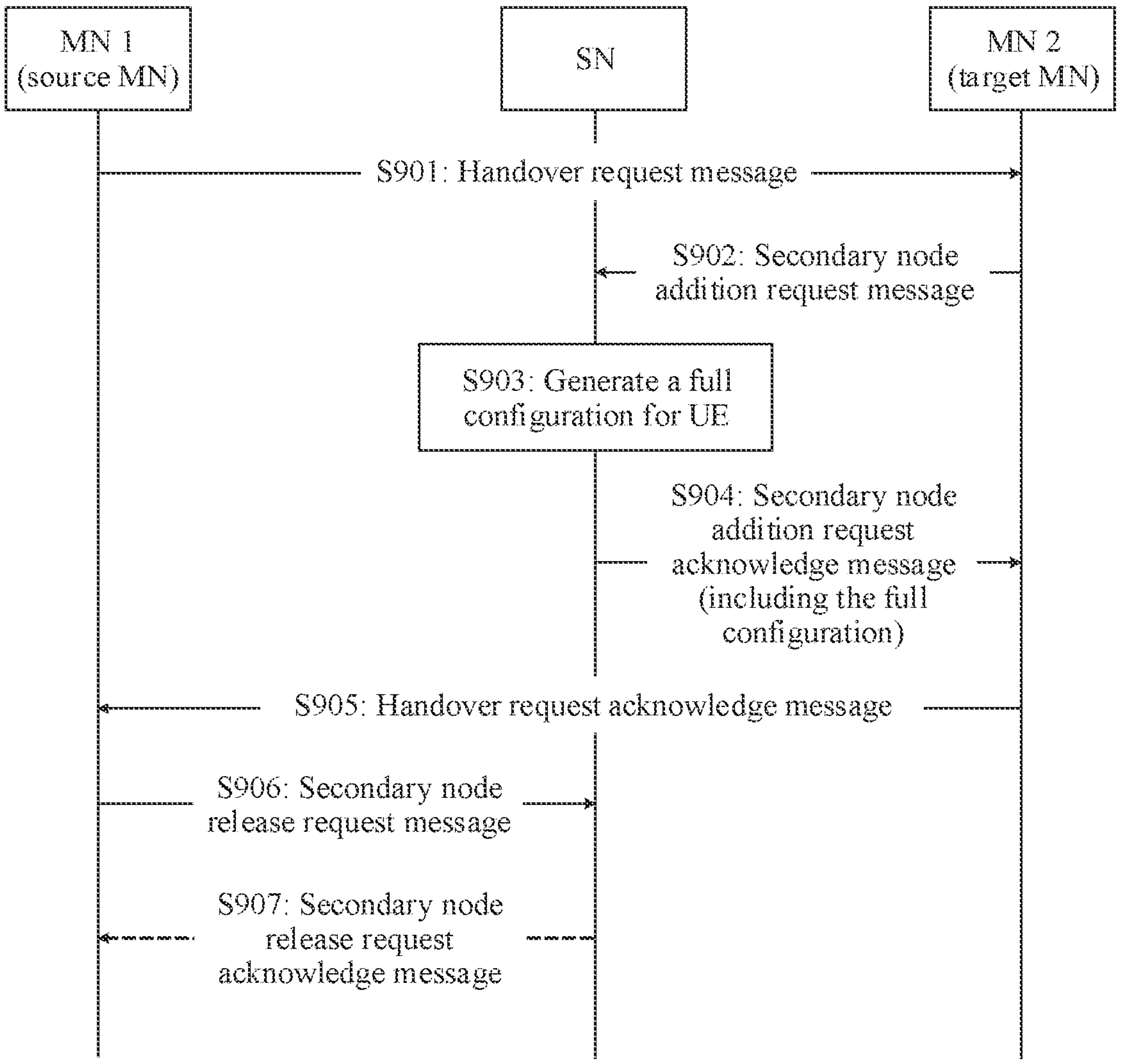
FIG. 9 is a schematic signaling flowchart of another communication method according to an embodiment of this application.

As shown in FIG. 8 and FIG. 9, this application provides another communication method, so that in a scenario in which a master node is handed over and a secondary node remains unchanged, the secondary node generates a full configuration for a terminal, to maintain normal communication between the terminal and the secondary node.

As shown in FIG. 8, the communication method includes the following steps.

S801: A first master node sends a secondary node addition request message to a secondary node, where the secondary node addition request message indicates the secondary node to provide a full configuration for a terminal.

Correspondingly, the secondary node receives the secondary node addition request message, generates the full configuration for the terminal, and sends the full configuration to the first master node.

The first master node and the secondary node provide a dual connectivity communication service for the terminal, and standards of the first master node and the secondary node may be the same or different. The secondary node addition request message may also be referred to as a secondary base station addition request message, for example, an SgNB addition request message. In this application, the full configuration may also be referred to as a set of full configurations, and may refer to all configurations, compared with a delta configuration, required for communication between the terminal and an access network device. The full configuration provided by the secondary node for the terminal may include configuration parameters that are provided by the secondary node for the terminal and that are used for communication between the terminal and the secondary node, for example, configuration parameters for establishing a bearer between the terminal and the secondary node. The configuration parameters include a cell group configuration parameter and a radio bearer configuration parameter. The cell group configuration parameter may include one or more of configuration parameters such as a radio link control (RLC) configuration, a media access control (MAC) configuration, and a cell configuration, and the radio bearer configuration parameter may include one or more of configuration parameters such as a PDCP configuration, a security configuration, and an SDAP configuration.

Optionally, the secondary node addition request message includes first indication information, and the first indication information is used to indicate the secondary node to provide the full configuration for the terminal.

In an implementation, the first indication information may indicate that the first master node determines to perform the full configuration for the terminal. In this application, a full configuration procedure includes that a target master node sends a full configuration indication to the terminal, to indicate the terminal to release all common configurations or some common configurations.

S802: The first master node receives the full configuration from the secondary node.

Optionally, the first master node receives, from the secondary node, an acknowledge message in response to the secondary node addition request message, where the acknowledge message includes the full configuration. The acknowledge message may be a secondary node/secondary base station addition request acknowledge message, for example, an SgNB addition request acknowledge message. Optionally, the acknowledge message further includes second indication information, and the second indication information is used to indicate that the secondary node generates the full configuration. Based on the second indication information, the first master node may learn that a configuration parameter included in the acknowledge message is the full configuration generated by the secondary node for the terminal.

Optionally, in an implementation of this application, the first master node is a target master node in a master node handover process of the terminal, and the terminal is handed over from a source master node (source MN) to the target master node. In this implementation, before S801, the method further includes S800: The first master node (target master node) receives a handover request message from the second master node (source master node). The handover request message includes a configuration of the terminal at the source master node, an identifier of the secondary node, and an interface identifier allocated by the secondary node to the terminal.

Standards of the target master node and the source master node are different, and the standard of the target master node/source master node may be the same as or different from a standard of the secondary node.

The interface identifier allocated by the secondary node to the terminal may be a UE X2AP ID or a UE XnAP ID. When determining to remain the source secondary node unchanged, the target master node may include the interface identifier in the secondary node addition request message, and send the secondary node addition request message to the source secondary node. Based on the interface identifier, the secondary node can know that the current addition request is for previous UE, and the secondary node remains unchanged.

Optionally, the method further includes: The target master node sends the received full configuration to the source master node.

Optionally, the method further includes: The target master node generates a configuration for the terminal, and sends the configuration and the full configuration generated by the secondary node to the source master node by using, for example, a handover request acknowledge message, so that the configuration and the full configuration generated by the secondary node are used to perform a secondary node release procedure between the source master node and the secondary node.

Optionally, in an implementation, the secondary node addition request message includes the interface identifier and the first indication information. The first indication information may be used to indicate that the target master node determines to perform the full configuration for the terminal. The target master node determines to send the foil configuration indication to the terminal, to indicate the terminal to release all common configurations, some dedicated configurations of the source master node, and some dedicated configurations of the source secondary node. For example, the terminal may release a measurement configuration or SLAP configuration of the source master node/source secondary node. In addition, the terminal may retain, for example, a cell radio network temporary identifier (C-RNTI) of an MCG or a security configuration of the MCG. After the master node receives the configuration from the secondary node, the full configuration indication may be sent to the terminal together with the configuration provided by the secondary node.

Optionally, in an implementation, if the target master node determines to remain the secondary node unchanged, and the target master node determines to generate the full configuration indication for the terminal, the target master node may not send the interface identifier to the secondary node. For example, the secondary node addition request message does not include the interface identifier. Specifically, for example, when the target master node does not understand the configuration of the source master node, and when the target master node determines to retain the secondary node, and the full configuration occurs on the target master node, that is, the target master node needs to send the full configuration indication to the terminal, the terminal deletes all configurations at the secondary node. In this case, the target master node does not send the interface identifier to the secondary node, and the secondary node does not know that the secondary node is retained, or the secondary node can determine that the secondary node can be used as only the target secondary node but does not know that the secondary node is the source secondary node. Therefore, the secondary node cannot directly associate with the context used when serving as the source secondary node to provide the delta configuration for the terminal, but generates the full configuration for the terminal.

Optionally, in an implementation, if the target master node determines to remain the secondary node unchanged, and no full configuration occurs on the target master node side, that is, the target master node does not need to send the full configuration indication to the terminal, the target master node may still send the interface identifier to the secondary node. For example, the secondary node addition request message includes the interface identifier, and the interface identifier is used to indicate that the secondary node remains unchanged. Because the terminal does not receive the full configuration indication, the terminal may not delete the configuration at the secondary base station. Therefore, in this scenario, the secondary node may provide the delta configuration for only the terminal without affecting a process in which the secondary node, serving as the target secondary node, provides a configuration for the terminal. It may be understood that, in this implementation, the secondary node addition request message may not include the first indication information.

Optionally, the acknowledge message that includes the full configuration and that is received by the target master node from the secondary node may further include third indication information, used to indicate that the secondary node is retained. It may be understood that the communication method may be applied to an inter-base-station handover (inter-MN handover), for example, a scenario in which the master node is handed over and the secondary node remains unchanged, and may also be applicable to intra-base-station handover (intra-MN handover). For example, if the terminal is configured with a supplementary uplink (SUL), if a configuration of the SUL needs to be deleted to perform intra-base-station handover, the master node may send the full configuration indication to the terminal, to indicate the terminal to delete some configurations including the configuration of the SUL, so that the master node may obtain the full configuration from the secondary node for subsequent communication. Details are not described again.

According to the foregoing communication method provided in this embodiment of this application, the secondary node may provide the full configuration for the terminal, to avoid affecting a configuration procedure between the terminal and the secondary node because the secondary node provides only the delta configuration, maintain normal communication between the terminal and the secondary node, and improve communication quality.

FIG. 9 is a schematic signaling flowchart of a communication method according to this application. An implementation shown in FIG. 9 is further explanations and descriptions of the communication method shown in FIG. 8. As shown in FIG. 9, MN 1 represents a source master node (source MN), MN 2 represents a target master node (target MN), SN represents a secondary node, and UE represents a terminal.

The communication method includes the following steps.

S901: The MN 1 sends a handover request message to the MN 2.

The handover request message includes a UE X2AP ID, a configuration of the UE at the MN 1, and an identifier of the SN.

S902: The MN 2 sends a secondary node addition request message to the SN.

Optionally, the secondary node addition request message includes the UE X2AP ID and first indication information, and the first indication information is used to indicate the SN to provide a full configuration for the UE. Specifically, the first indication information may be used to indicate that the MN 2 performs a full configuration for the UE. The MN 2 may send a full configuration indication, for example, a 1-bit indication, to the UE, so that the UE may release all configurations at the SN, to receive and perform new configurations obtained from the MN 2 and the SN.

Optionally, the secondary node addition request message does not include the UE X2AP ID and the first indication information.

For specific descriptions of the secondary node addition request message, refer to related content in S602. Details are not described again.

S903: The SN generates the full configuration for the UE.

For descriptions of the full configuration, refer to related content in the embodiment shown in FIG. 8. Details are not described again.

S904: The SN sends a secondary node addition request acknowledge message to the MN 2.

The secondary node addition request acknowledge message includes the full configuration.

S905: The MN 2 sends a handover request acknowledge message to the MN 1.

The handover acknowledge message may include the full configuration and a configuration generated by the MN 2 for the UE.

The full configuration may be transparently transmitted, for example, encapsulated in a container and sent to the MN 1.

S906: The MN 1 sends a secondary node release request message to the SN.

The MN 1 obtains the full configuration in the secondary node release request message and the configuration generated by the MN 2 for the UE, to perform an SN release procedure.

S907: The SN sends a secondary node release request acknowledge message to the MN 1.

If the acknowledge message is sent successfully, it indicates that the SN release procedure is completed. For the SN release procedure, refer to other embodiments of this application, for example, related content in the embodiments shown in FIG. 4 to FIG. 7. Details are not described again.

Optionally, the method further includes: The MN 2 includes the full configuration in a handover command generated for the UE, sends the handover command to the MN 1, and then sends the full configuration to the UE via the MN 1. In this way, the UE may obtain the configuration to perform a communication process with the MN 2/SN.

According to the foregoing communication method, in a scenario where the master node is handed over and the secondary node remains unchanged, the secondary node may provide the full configuration for the terminal, to avoid a problem that the terminal cannot complete a configuration procedure with the secondary node because the secondary node provides only the delta configuration, so that the terminal can always maintain normal communication with the secondary node after the master node is handed over, and communication quality is improved.

The foregoing describes in detail examples of the communication method according to this application. It may be understood that, to implement the foregoing functions, a communication apparatus includes corresponding hardware structures and/or software modules for performing the functions. A person skilled in the art should easily be aware that, in combination with the examples described in the embodiments disclosed in this specification, units and algorithm steps may be implemented by hardware or a combination of hardware and computer software in this application. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In this application, the communication apparatus may be divided into function units based on the foregoing method examples. For example, each function unit may be obtained through division based on a corresponding function, or two or more functions may be integrated into one processing unit. The integrated unit may be implemented in a form of hardware, or may be implemented in a form of a software function unit. It should be noted that, division into the units in this application is an example, and is merely logical function division. During actual implementation, another division manner may be used.

Figure 10:
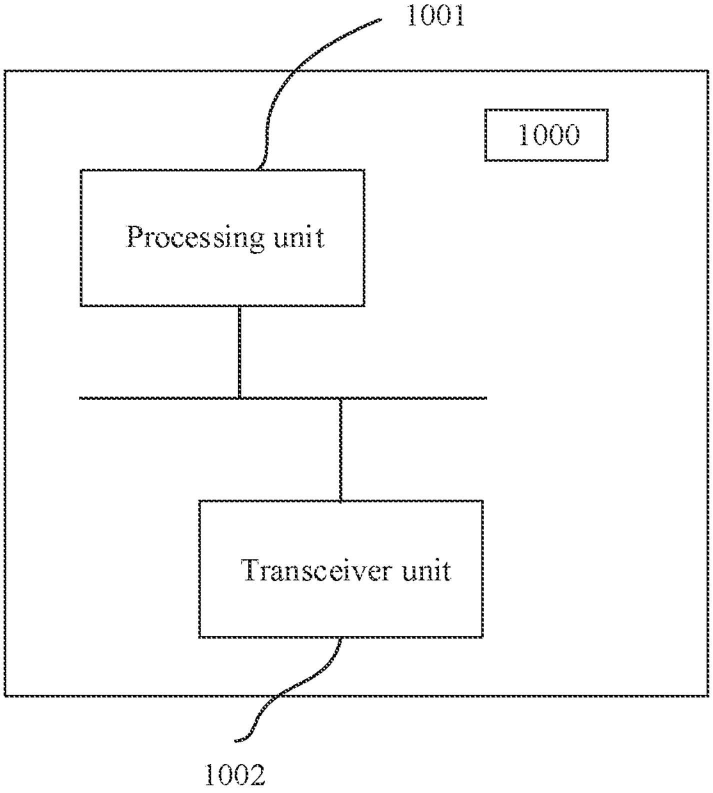
FIG. 10 is a schematic diagram of a structure of a communication apparatus 1000 according to an embodiment of this application.

For example, a communication apparatus 1000 shown in FIG. 10 includes a processing unit 1001 and a transceiver unit 1002.

In an implementation of this application, the communication apparatus 1000 is configured to support an access network device in implementing a function of a master node in the communication method provided in the embodiments of this application. For example, the transceiver unit 1002 may be configured to receive a first message from a secondary node, where the first message is used to release the secondary node, and the first message includes a current configuration of a terminal at the secondary node. The processing unit 1001 may be configured to generate a delta configuration for the terminal based on the current configuration. The transceiver unit 1002 may be further configured to send the delta configuration to the terminal. For another example, the processing unit 1001 sends a secondary node addition request message to the secondary node by using the transceiver unit 1002, where the secondary node addition request message indicates the secondary node to provide a full configuration for the terminal. The processing unit 1001 receives the full configuration from the secondary node by using the transceiver unit 1002.

In an implementation of this application, the communication apparatus 1000 is configured to support an access network device in implementing a function of a secondary node in the communication method provided in the embodiments of this application. For example, the processing unit 1001 may be configured to send a first message to a master node by using the transceiver unit 1002, where the first message is used to release the secondary node, the first message includes a current configuration of a terminal at the secondary node, and the current configuration is used to generate a delta configuration for the terminal. For another example, the processing unit 1001 receives a secondary node addition request message from a first master node by using the transceiver unit 1002, where the secondary node addition request message indicates the secondary node to provide a full configuration for the terminal. The processing unit 1001 sends the full configuration to the first master node by using the transceiver unit 1002. The processing unit 1001 may be further configured to generate the full configuration.

In an implementation of this application, the communication apparatus 1000 is configured to support a terminal in implementing a function of a terminal/UE in the communication method provided in the embodiments of this application. For example, the processing unit 1001 may be configured to receive a delta configuration from a master node by using the transceiver unit 1002, where the delta configuration is determined by the master node based on a current configuration of the terminal at a secondary node. The processing unit 1001 may be configured to perform the delta configuration. For another example, the processing unit 1001 may be configured to receive a full configuration from a first master node by using the transceiver unit 1002, where the full configuration is provided by the secondary node for the terminal. The processing unit 1001 is further configured to perform the full configuration.

For detailed descriptions of operations performed by functional units of the communication apparatus 1000, refer to, for example, behaviors of the terminal or access network device (the master node/secondary node) in the embodiments of the communication method, provided by this application, for example, related content in the embodiments shown in FIG. 4 to FIG. 9. Details are not described herein.

In another implementation of this application, in hardware implementation, one processor may perform a function of the processing unit 1001, and a transceiver (a transmitter/a receiver) and/or a communication interface may perform a function of the transceiver unit 1002. The processing unit 1001 may be embedded in or independent of a processor of a terminal in a form of hardware, or may be stored in a memory of a terminal or base station in a form of software, so that the processor invokes and performs operations corresponding to the foregoing functional units.

Figure 11:
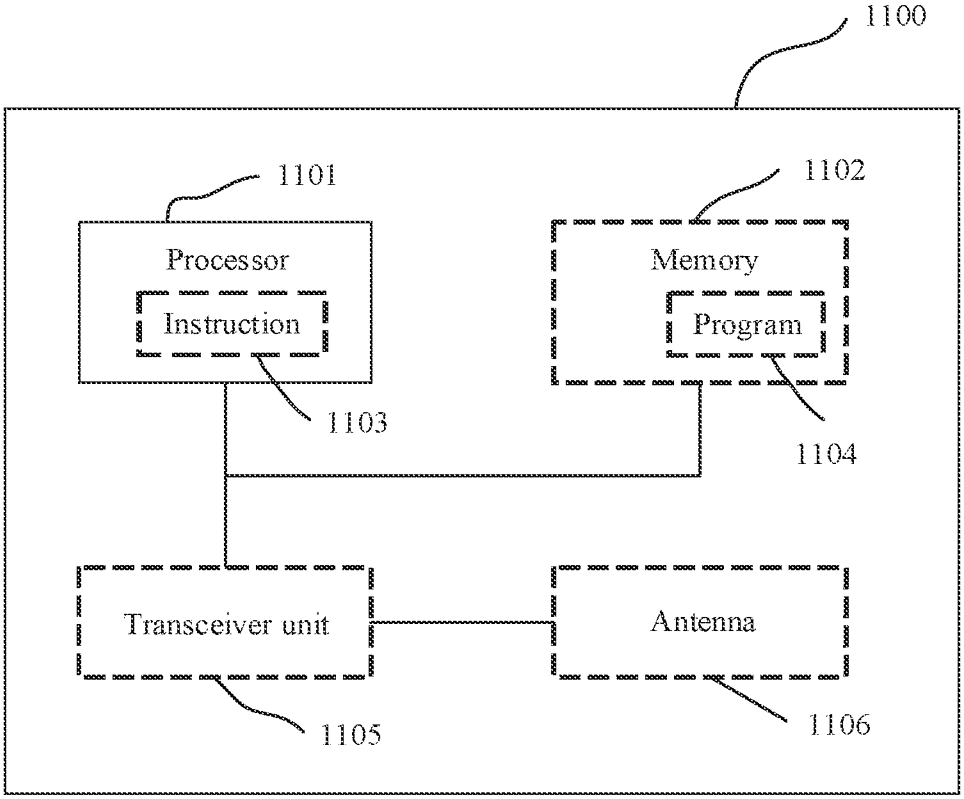
FIG. 11 is a schematic diagram of a structure of a communication apparatus 1100 according to an embodiment of this application.

FIG. 11 is a schematic diagram of a structure of a communication apparatus 1100 according to this application. The communication apparatus 1100 may be configured to implement the communication methods described in the foregoing method embodiments. The communication apparatus 1100 may be a chip, a terminal, an access network device, another wireless communication device, or the like.

The communication apparatus 1100 includes one or more processors 1101, and the one or more processors 1101 may support the communication apparatus 1000 in implementing a communication method performed by the access network device in the embodiments of this application, for example, the methods performed by the master node or the secondary node in the embodiments shown in FIG. 4 to FIG. 9. Alternatively, the one or more processors 1101 may support the communication apparatus 1100 in implementing a method performed by the terminal in the embodiments of this application, for example, the methods performed by the terminal (UE) in the embodiments shown in FIG. 4 to FIG. 9.

The processor 1101 may be a general-purpose processor or a dedicated processor. For example, the processor 1101 may include a central processing unit (CPU) and/or a baseband processor. The baseband processor may be configured to process communication data (for example, the first message described above), and the CPU may be configured to implement corresponding control and processing functions, execute a software program, and process data of the software program.

Further, the communication apparatus 1100 may further include a transceiver unit 1105, configured to input (receive) and output (send) a signal.

For example, the communication apparatus 1100 may be a chip, and the transceiver unit 1105 may be an input and/or output circuit of the chip. Alternatively, the transceiver unit 1105 may be a communication interface of the chip, and the chip may be used as a component of UE, a base station, or another wireless communication device.

For another example, the communication apparatus 1100 may be UE or a base station. The transceiver unit 1105 may include a transceiver or a radio frequency chip. The transceiver unit 1105 may further include a communication interface.

Optionally, the communication apparatus 1100 may further include an antenna 1106, which may be configured to support the transceiver unit 1105 in implementing a sending function and a receiving function of the communication apparatus 1100.

Optionally, the communication apparatus 1100 may include one or more memories 1102. The memory 1102 stores a program (which may also be instructions or code) 1103, and the program 1103 may be run by the processor 1101, so that the processor 1101 performs the methods described in the foregoing method embodiments. Optionally, the memory 1102 may further store data. Optionally, the processor 1101 may further read data (for example, predefined information) stored in the memory 1102. The data and the program 1103 may be stored at a same storage address, or the data and the program 1103 may be stored at different storage addresses.

The processor 1101 and the memory 1102 may be disposed separately, or may be integrated together, for example, integrated on a board or integrated into a system on chip (SOC).

In a possible design, the communication apparatus 1100 is an access network device or a chip that may be used in the access network device, the access network device may be used as a master node in dual connectivity communication, and a communication interface in the transceiver unit 1105 may be configured to receive a first message from a secondary node. The first message is used to release the secondary node, and the first message includes a current configuration of a terminal at the secondary node. The processor 1101 may be configured to generate a delta configuration for the terminal based on the current configuration. A transceiver in the transceiver unit 1105 may be configured to send the delta configuration to the terminal.

In a possible design, the communication apparatus 1100 is an access network device or a chip that may be used in the access network device, the access network device may be used as a secondary node in dual connectivity communication, and a communication interface in the transceiver unit 1105 may be configured to send a first message to a master node. The first message is used to release the secondary node, the first message includes a current configuration of a terminal at the secondary node, and the current configuration is used to generate a delta configuration for the terminal. The processor 1101 may be configured to: determine the current configuration, and generate the first message.

In a possible design, the communication apparatus 1100 may be a terminal device or a chip that may be used in the terminal device. A transceiver in the transceiver unit 1105 may be configured to receive a delta configuration from a master node. The delta configuration is determined by the master node based on a current configuration of the terminal at a secondary node. The processor 1101 may be configured to perform the delta configuration.

For detailed descriptions of the operations performed by the communication apparatus 1100 in the foregoing possible designs, refer to related content in the method embodiments of this application. Details are not described.

It should be understood that steps in the foregoing method embodiments may be implemented by using a logic circuit in a form of hardware or an instruction in a form of software in the processor 1101. The processor 1101 may be a CPU, a digital signal processor (DSP), an application-specific integrated circuit (ASIC), a field programmable gate array (FPGA), or another programmable logic device, for example, a discrete gate, a transistor logic device, or a discrete hardware component.

This application further provides a computer program product. When the computer program product is executed by the processor 1101, the communication method according to any one of the method embodiments of this application is implemented. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media.

The computer program product may be stored in the memory 1102. For example, the computer program product is a program 1104. After processing processes such as preprocessing, compilation, assembly, and linking, the program 1104 is finally converted into an executable target file that can be executed by the processor 1101.

This application further provides a computer-readable storage medium. The computer-readable storage medium stores a computer program. When the computer program is executed by a computer, the communication method according to any one of the method embodiments of this application is implemented. The computer program may be a high-level language program, or may be an executable target program.

The computer-readable storage medium is, for example, the memory 1102. The memory 1102 may be a volatile memory or a nonvolatile memory, or the memory 1102 may include both a volatile memory and a nonvolatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through examples rather than limitative descriptions, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

Figure 12:
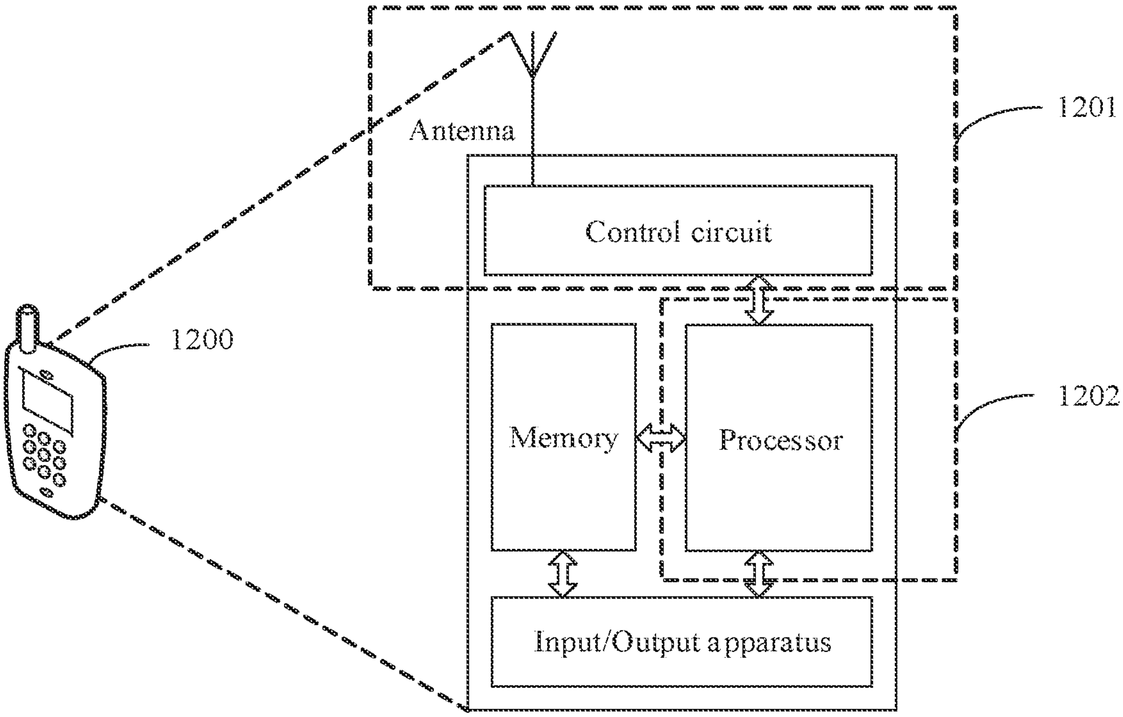
FIG. 12 is a schematic diagram of a structure of a terminal 1200 according to an embodiment of this application.

When the communication apparatus 1100 is a terminal, FIG. 12 is a schematic diagram of a structure of a terminal according to this application. The terminal 1100 may be used in the system shown in FIG. 1, to perform a function of the terminal in the method embodiments. For ease of description, FIG. 12 shows only main components of the terminal.

As shown in FIG. 12, the terminal 1200 includes a processor, a memory, a control circuit, an antenna, and an input/output apparatus. The processor is mainly configured to: process a communication protocol and communication data, and control the entire terminal. For example, the processor generates a first message, and then sends the first message by using the control circuit and the antenna. The memory is mainly configured to store a program and data, for example, store a communication protocol and the foregoing configuration information. The control circuit is mainly configured to perform conversion between a baseband signal and a radio frequency signal and process the radio frequency signal. The control circuit, together with the antenna, may also be referred to as a transceiver that is mainly configured to send and receive a radio frequency signal in an electromagnetic wave form. The input/output apparatus is, for example, a touchscreen, a display screen, or a keyboard, and is mainly configured to receive data entered by a user and output data to the user.

After the terminal is powered on, the processor may read the program in the memory, interpret and execute instructions included in the program, and process data in the program. When information needs to be sent by using the antenna, the processor performs baseband processing on the to-be-sent information, and outputs a baseband signal to a radio frequency circuit. The radio frequency circuit performs radio frequency processing on the baseband signal to obtain a radio frequency signal, and sends the radio frequency signal in an electromagnetic wave form by using the antenna. When an electromagnetic wave (namely, the radio frequency signal) that carries information arrives at the terminal, the radio frequency circuit receives the radio frequency signal by using the antenna, converts the radio frequency signal into the baseband signal, and outputs the baseband signal to the processor. The processor converts the baseband signal into the information, and processes the information.

A person skilled in the art may understand that for ease of description, FIG. 12 shows only one memory and only one processor. In an actual terminal, there may be a plurality of processors and a plurality of memories. The memory may also be referred to as a storage medium, a storage device, or the like. This is not limited in this application.

In an optional implementation, the processor in FIG. 12 may integrate functions of a baseband processor and a CPU. A person skilled in the art may understand that the baseband processor and the CPU may alternatively be independent processors, and are interconnected by using a technology such as a bus. A person skilled in the art may understand that the terminal may include a plurality of baseband processors to adapt to different network standards, and the terminal may include a plurality of CPUs to enhance a processing capability of the terminal. All components of the terminal may be connected by using various buses. The baseband processor may also be referred to as a baseband processing circuit or a baseband processing chip. The CPU may also be referred to as a central processing circuit or a central processing chip. A function of processing the communication protocol and the communication data may be embedded into the processor, or may be stored in the memory in a form of a program, so that the processor executes the program in the memory to implement a baseband processing function.

In this application, the antenna and the control circuit that have a sending function and a receiving function may be considered as a transceiver unit 1201 of the terminal device 1200. The transceiver unit 1201 is configured to support the terminal device in implementing the receiving function in the method embodiment, or is configured to support the terminal device in implementing the sending function in the method embodiment. A processor having a processing function is considered as a processing unit 1202 of the terminal 1200. As shown in FIG. 12, the terminal 1200 includes the transceiver unit 1201 and the processing unit 1202. The transceiver unit may also be referred to as a transceiver, a transceiver machine, a transceiver apparatus, or the like. Optionally, a device configured to implement the receiving function in the transceiver unit 1201 may be considered as a receiving unit, and a device configured to implement the sending function in the transceiver unit 1201 may be considered as a sending unit. In other words, the transceiver unit 1201 includes the receiving unit and the sending unit. The receiving unit may also be referred to as a receiver, an input port, a receiver circuit, or the like. The sending unit may be referred to as a transmitter, a transmitter machine, a transmitter circuit, or the like.

The processor 1202 may be configured to execute a program stored in the memory, to control the transceiver unit 1201 to receive a signal and/or send a signal, to complete a function of the terminal in the foregoing method embodiments. In an implementation, it may be considered that the function of the transceiver unit 1201 is implemented by using a transceiver circuit or a transceiver-dedicated chip.

The processor 1202 may perform a function of the processing unit 1001 in the communication apparatus 1000 shown in FIG. 10 or a function of the processor 1101 in the communication apparatus 1100 shown in FIG. 11. The transceiver unit 1201 may perform a function of the transceiver unit 1002 in the communication apparatus 1000 shown in FIG. 10 or a function of the transceiver unit 1105 in the communication apparatus 1100 shown in FIG. 11. Details are not described herein.

Figure 13:
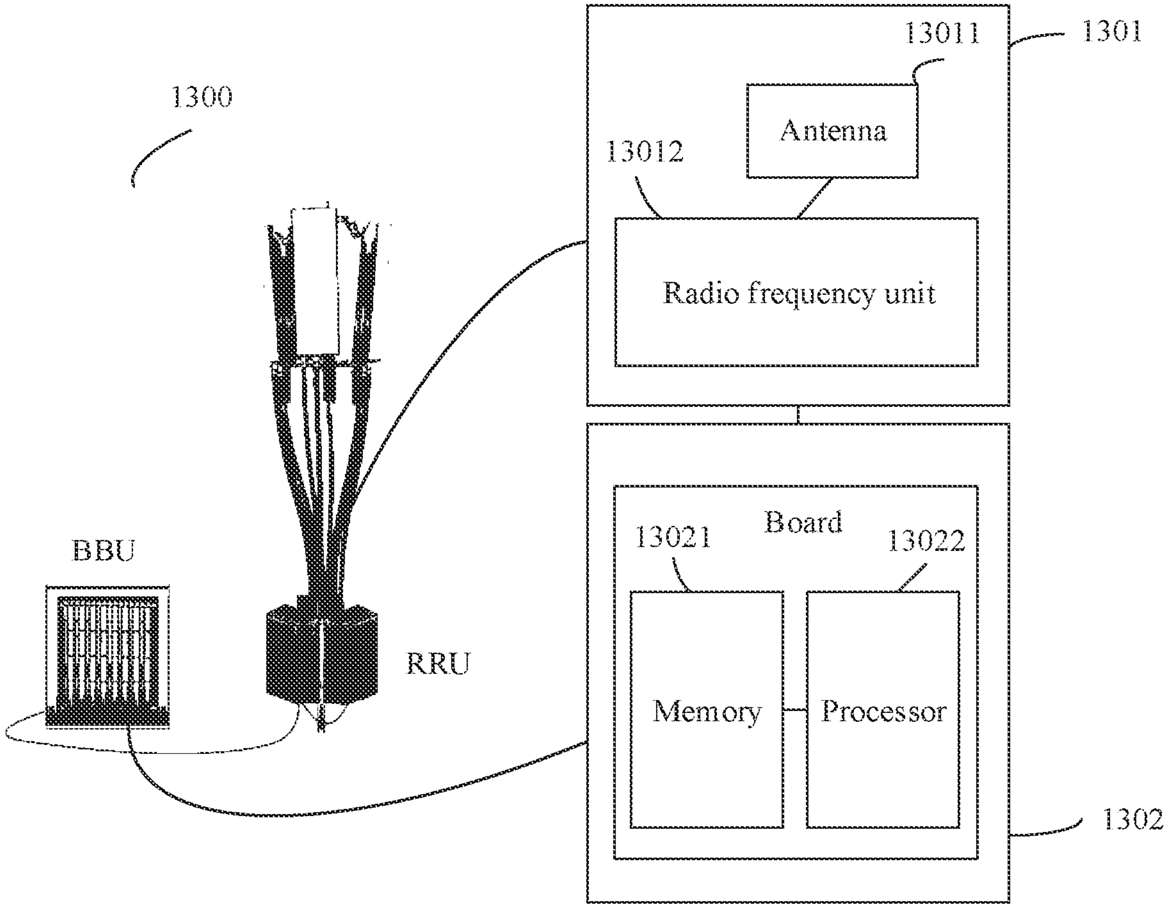
FIG. 13 is a schematic diagram of a structure of an access network device 1300 according to an embodiment of this application.

When the communication apparatus 1100 is an access network device, FIG. 13 is a schematic diagram of a structure of an access network device according to this application. The access network device may be, for example, a base station. As shown in FIG. 13, the base station may be used in the system shown in FIG. 1, to implement a function of the master node or secondary node in the foregoing method embodiments. A base station 1300 may include one or more radio frequency units, for example, a remote radio unit (RRU) 1301 and at least one baseband unit (BBU) 1302. The BBU 1302 may include a DU, or may include a DU and a CU.

The RRU 1301 may be referred to as a transceiver unit, a transceiver machine, a transceiver circuit, a transceiver, or the like, and may include at least one antenna 13011 and a radio frequency unit 13012. The RRU 1301 is mainly configured to: receive or send a radio frequency signal, and perform conversion between a radio frequency signal and a baseband signal, for example, configured to support the base station in implementing a sending function and a receiving function of the access network device in the method embodiments. The BBU 1302 is mainly configured to: perform baseband processing, control the base station, and the like. The RRU 1301 and the BBU 1302 may be physically disposed together, or may be physically separated, namely, a distributed base station.

The BBU 1302 may also be referred to as a processing unit, and is mainly configured to complete a baseband processing function such as channel coding, multiplexing, modulation, or spreading. For example, the BBU 1302 may be configured to control the base station to perform an operation procedure related to the access network device in the foregoing method embodiments.

The BBU 1302 may include one or more boards. A plurality of boards may jointly support a radio access network (for example, a 5G network) of a single access standard, or may separately support radio access networks (for example, an LTE network and a 5G network) of different access standards. The BBU 1302 further includes a memory 13021 and a processor 13022. The memory 13021 is configured to store necessary instructions and necessary data. For example, the memory 13021 stores various information in the foregoing method embodiments. The processor 13022 is configured to control the base station to perform a necessary action, for example, is configured to control the base station to perform an operation procedure in the foregoing method embodiments. The memory 13021 and the processor 13022 may serve the one or more boards. In other words, the memory 13021 and the processor 13022 may be independently disposed on each board. Alternatively, the plurality of boards may share the same memory and the same processor. In addition, each board may be further provided with a necessary circuit.

The BBU 1302 may perform a function of the processing unit 1001 in the communication apparatus 1000 shown in FIG. 10 or a function of the processor 1101 in the communication apparatus 1100 shown in FIG. 11. The RRU 1301 may perform a function of the transceiver unit 1002 in the communication apparatus 1000 shown in FIG. 10 or a function of the transceiver unit 1105 in the communication apparatus 1100 shown in FIG. 11. Details are not described herein.

This application further provides a communication system, including a first access network device and a second access network device. The first access network device may serve as a master node, and the second access network device may serve as a secondary node.

Optionally, the communication system further includes a terminal, and the terminal may communicate with the first access network device and the second access network device. For functions of devices in the communication system, refer to related descriptions in other embodiments of this application. Details are not described.

A person skilled in the art may be clearly aware that, the descriptions of the embodiments provided in this application may be referred to each other. For convenience and conciseness, for example, for functions of the apparatuses and devices provided in the embodiments of this application and the performed steps, refer to related descriptions of the method embodiments of this application. The method embodiments and the apparatus embodiments may also be referred to each other or combined with each other.

In the several embodiments provided in this application, the disclosed system, apparatus, and method may be implemented in other manners. For example, some features of the method embodiments described above may be ignored or not performed. The described apparatus embodiments are merely examples. Division into the units is merely logical function division and may be other division during actual implementation. A plurality of units or components may be combined or integrated into another system. In addition, a coupling between the units or a coupling between the components may be a direct coupling, or may be an indirect coupling. The foregoing coupling includes an electrical connection, a mechanical connection, or a connection in another form.

It should be understood that values of sequence numbers of the foregoing processes do not mean execution sequences in the various embodiments of this application. The execution sequences of the processes should be determined based on functions and internal logic of the processes, and should not be construed as any limitation on the implementation processes of the embodiments of this application. In addition, in the embodiments of this application, the terminal and/or the network device may perform some or all steps in the embodiments of this application. These steps or operations are merely examples. In the embodiments of this application, other operations or variations of various operations may be further performed. In addition, the steps may be performed in a sequence different from a sequence presented in the embodiments of this application, and not all the operations in the embodiments of this application may be performed.

What is claimed is:

1. A communication method, comprising:

receiving, by a master node, a first message from a secondary node, wherein the first message is used to release the secondary node, wherein the first message comprises a current configuration of a terminal at the secondary node, and wherein the current configuration comprises a packet data convergence protocol (PDCP) configuration of a secondary node terminated bearer and a service data adaptation protocol (SDAP) configuration of the secondary node terminated bearer;

in response to receiving the first message from the secondary node, determining, by the master node, to modify all or a portion of the current configuration to generate a delta configuration, wherein determining, by the master node, to modify the all or the portion of the current configuration to generate the delta configuration comprises:

determining, by the master node, whether the current configuration includes a configuration parameter that can be reused in a master node terminated bearer to be established between the terminal and the master node;

generating, by the master node, the delta configuration for the terminal based on the current configuration comprised in the first message; and sending, by the master node, the delta configuration to the terminal.

2. The method according to claim 1, wherein the first message is a secondary node release request acknowledge message.

3. The method according to claim 2, further comprising:

sending, by the master node, a secondary node release request message to the secondary node, wherein the secondary node release request message indicates the secondary node to send the current configuration to the master node.

4. The method according to claim 3, wherein the secondary node release request message comprises indication information, and wherein the indication information indicates the secondary node to send the current configuration to the master node.

5. The method according to claim 1, wherein the first message is a secondary node release required message.

6. A communications apparatus, comprising:

at least one processor; and one or more memories coupled to the at least one processor and storing programming instructions for execution by the at least one processor to:

receive a first message from a secondary node, wherein the first message is used to release the secondary node, wherein the first message comprises a current configuration of a terminal at the secondary node, and wherein the current configuration comprises a packet data convergence protocol (PDCP) configuration of a secondary node terminated bearer and a service data adaptation protocol (SDAP) configuration of the secondary node terminated bearer;

in response to receiving the first message from the secondary node, determine to modify all or a portion of the current configuration to generate a delta configuration, wherein determining to modify the all or the portion of the current configuration to generate the delta configuration comprises:

determining whether the current configuration includes a configuration parameter that can be reused in a master node terminated bearer to be established between the terminal and the apparatus;

generate the delta configuration for the terminal based on the current configuration comprised in the first message; and send the delta configuration to the terminal.

7. The apparatus according to claim 6, wherein the first message is a secondary node release request acknowledge message.

8. The apparatus according to claim 7, wherein the programming instructions are for execution by the at least one processor to:

send a secondary node release request message to the secondary node, wherein the secondary node release request message indicates the secondary node to send the current configuration to the apparatus.

9. The apparatus according to claim 8, wherein the secondary node release request message comprises indication information, and wherein the indication information indicates the secondary node to send the current configuration to the apparatus.

10. The apparatus according to claim 6, wherein the first message is a secondary node release required message.

11. A communications apparatus, comprising:

at least one processor; and one or more memories coupled to the at least one processor and storing programming instructions for execution by the at least one processor to:

receive a delta configuration from a master node, wherein the delta configuration is generated by the master node based on determining to modify all or a portion of a current configuration of the apparatus at a secondary node, wherein determining to modify the all or the portion of the current configuration comprises determining whether the current configuration includes a configuration parameter that can be reused in a master node terminated bearer to be established between the apparatus and the master node, wherein the current configuration comprises a packet data convergence protocol (PDCP) configuration of a secondary node terminated bearer and a service data adaptation protocol (SDAP) configuration of the secondary node terminated bearer, and wherein the current configuration is comprised in a message from the secondary node to the master node; and perform the delta configuration.

12. The apparatus according to claim 11, wherein performing the delta configuration comprises:

using the delta configuration for bearer reconfiguration, wherein the bearer reconfiguration comprises changing a bearer of the apparatus from the secondary node terminated bearer to a master node terminated bearer.

13. The method according to claim 1, further comprising in response to determining that the current configuration does not include the configuration parameter that can be reused in the master node terminated bearer, determining, by the master node, to modify the all of the current configuration to generate the delta configuration.

14. The method according to claim 1, further comprising in response to determining that the current configuration includes the configuration parameter that can be reused in the master node terminated bearer, determining, by the master node, to modify the portion of the current configuration to generate the delta configuration.

15. The method according to claim 14, wherein the portion of the current configuration to be modified does not include the configuration parameter that can be reused in the master node terminated bearer.

16. The apparatus according to claim 6, wherein the programming instructions are for execution by the at least one processor to:

in response to determining that the current configuration does not include the configuration parameter that can be reused in the master node terminated bearer, determine to modify the all of the current configuration to generate the delta configuration.

17. The apparatus according to claim 6, wherein the programming instructions are for execution by the at least one processor to:

in response to determining that the current configuration includes the configuration parameter that can be reused in the master node terminated bearer, determine to modify the portion of the current configuration to generate the delta configuration.

18. The method according to claim 1, wherein the secondary node terminated bearer is a bearer established at the secondary node and between the terminal and the secondary node.

* * * * *